(12) United States Patent
Ferguson et al.

(10) Patent No.: US 8,949,016 B1
(45) Date of Patent: Feb. 3, 2015

(54) SYSTEMS AND METHODS FOR DETERMINING WHETHER A DRIVING ENVIRONMENT HAS CHANGED

(71) Applicant: Google Inc., Mountain View, CA (US)

(72) Inventors: David I. Ferguson, San Francisco, CA (US); Dmitri A. Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 46 days.

(21) Appl. No.: 13/630,039

(22) Filed: Sep. 28, 2012

(51) Int. Cl.
- *G06F 17/10* (2006.01)
- *B60Q 1/00* (2006.01)
- *G01C 22/00* (2006.01)

(52) U.S. Cl.
USPC .............................. 701/301; 340/436; 701/23

(58) Field of Classification Search
USPC .......................... 701/26, 70, 301, 23; 340/436
See application file for complete search history.

(56) References Cited

U.S. PATENT DOCUMENTS

| | | |
|---|---|---|
| 1,924,984 A | 8/1933 | Fageol |
| 3,186,508 A | 6/1965 | Lamont |
| 3,324,805 A | 6/1967 | Mulch |
| 3,596,728 A | 8/1971 | Neville |
| 4,372,414 A | 2/1983 | Anderson et al. |
| 4,387,783 A | 6/1983 | Carman |
| 4,656,834 A | 4/1987 | Elpern |
| 4,924,795 A | 5/1990 | Ottemann |
| 4,970,653 A * | 11/1990 | Kenue ............................ 701/301 |
| 4,982,072 A | 1/1991 | Takigami |
| 5,187,666 A | 2/1993 | Watanabe |
| 5,415,468 A | 5/1995 | Latarnik et al. |
| 5,448,487 A | 9/1995 | Arai |
| 5,470,134 A | 11/1995 | Toepfer et al. |
| 5,684,696 A | 11/1997 | Rao et al. |
| 5,774,069 A | 6/1998 | Tanaka et al. |
| 5,790,403 A * | 8/1998 | Nakayama ...................... 701/28 |
| 5,906,645 A | 5/1999 | Kagawa et al. |

(Continued)

FOREIGN PATENT DOCUMENTS

| | | |
|---|---|---|
| EP | 0884666 A1 | 12/1998 |
| EP | 2216225 A1 | 8/2010 |

(Continued)

OTHER PUBLICATIONS

Eric Guizzo, How's Google's Self-Driving Car Works, IEEE.Org, IEEE, Oct. 18, 2011, pp. 1/31-31/31.*

(Continued)

*Primary Examiner* — Thomas G Black
*Assistant Examiner* — Tyler Page
(74) *Attorney, Agent, or Firm* — Lerner, David, Littenberg, Krumholz & Mentlik, LLP

(57) ABSTRACT

A autonomous driving computer system determines whether a driving environment has changed. One or more objects and/or object types in the driving environment may be identified as primary objects. The autonomous driving computer system may be configured to detect the primary objects and/or object types, and compare the detected objects and/or object types with the previous known location of the detected object and/or object types. The autonomous driving computer system may obtain several different metrics to facilitate the comparison. A confidence probability obtained from the comparison may indicate the degree of confidence that the autonomous driving computer system has in determining that the driving environment has actually changed.

20 Claims, 16 Drawing Sheets

(56) References Cited

U.S. PATENT DOCUMENTS

| | | | |
|---|---|---|---|
| 5,913,376 A | 6/1999 | Takei | |
| 6,064,926 A | 5/2000 | Sarangapani et al. | |
| 6,070,682 A | 6/2000 | Isogai et al. | |
| 6,151,539 A | 11/2000 | Bergholz et al. | |
| 6,195,610 B1 | 2/2001 | Kaneko | |
| 6,321,147 B1 | 11/2001 | Takeda et al. | |
| 6,332,354 B1 | 12/2001 | Lalor et al. | |
| 6,343,247 B2 | 1/2002 | Jitsukata et al. | |
| 6,385,539 B1 | 5/2002 | Wilson et al. | |
| 6,438,472 B1 | 8/2002 | Tano et al. | |
| 6,438,491 B1 | 8/2002 | Farmer | |
| 6,470,874 B1 | 10/2002 | Mertes | |
| 6,504,259 B1 | 1/2003 | Kuroda et al. | |
| 6,516,262 B2 | 2/2003 | Takenaga et al. | |
| 6,591,172 B2 | 7/2003 | Oda et al. | |
| 6,643,576 B1 | 11/2003 | O Connor et al. | |
| 6,832,156 B2 | 12/2004 | Farmer | |
| 6,836,719 B2 | 12/2004 | Andersson et al. | |
| 6,847,869 B2 | 1/2005 | Dewberry et al. | |
| 6,862,524 B1 | 3/2005 | Nagda et al. | |
| 6,876,908 B2 | 4/2005 | Cramer et al. | |
| 6,934,613 B2 | 8/2005 | Yun | |
| 7,011,186 B2 | 3/2006 | Frentz et al. | |
| 7,031,829 B2 | 4/2006 | Nisiyama | |
| 7,102,496 B1 | 9/2006 | Ernst, Jr. et al. | |
| 7,177,760 B2 | 2/2007 | Kudo | |
| 7,194,347 B2 | 3/2007 | Harumoto et al. | |
| 7,207,304 B2 | 4/2007 | Iwatsuki et al. | |
| 7,233,861 B2 | 6/2007 | Van Buer et al. | |
| 7,327,242 B2 | 2/2008 | Holloway et al. | |
| 7,346,439 B2 | 3/2008 | Bodin | |
| 7,394,046 B2 | 7/2008 | Olsson et al. | |
| 7,486,802 B2 | 2/2009 | Hougen | |
| 7,499,774 B2 | 3/2009 | Barrett et al. | |
| 7,499,776 B2 | 3/2009 | Allard et al. | |
| 7,499,804 B2 | 3/2009 | Svendsen et al. | |
| 7,515,101 B1 | 4/2009 | Bhogal et al. | |
| 7,565,241 B2 | 7/2009 | Tauchi | |
| 7,579,942 B2 | 8/2009 | Kalik | |
| 7,656,280 B2 | 2/2010 | Hines et al. | |
| 7,694,555 B2 | 4/2010 | Howell et al. | |
| 7,778,759 B2 | 8/2010 | Tange et al. | |
| 7,818,124 B2 | 10/2010 | Herbst et al. | |
| 7,865,277 B1 | 1/2011 | Larson et al. | |
| 7,894,951 B2 | 2/2011 | Norris et al. | |
| 7,908,040 B2 | 3/2011 | Howard et al. | |
| 7,956,730 B2 | 6/2011 | White et al. | |
| 7,979,175 B2 | 7/2011 | Allard et al. | |
| 8,050,863 B2 | 11/2011 | Trepagnier et al. | |
| 8,078,349 B1 | 12/2011 | Prada Gomez et al. | |
| 8,126,642 B2 * | 2/2012 | Trepagnier et al. | 701/423 |
| 8,190,322 B2 | 5/2012 | Lin et al. | |
| 8,195,341 B2 | 6/2012 | Huang et al. | |
| 8,244,408 B2 | 8/2012 | Lee et al. | |
| 8,260,515 B2 | 9/2012 | Huang et al. | |
| 8,280,601 B2 | 10/2012 | Huang et al. | |
| 8,280,623 B2 * | 10/2012 | Trepagnier et al. | 701/301 |
| 8,352,111 B2 | 1/2013 | Mudalige | |
| 8,352,112 B2 | 1/2013 | Mudalige | |
| 8,412,449 B2 * | 4/2013 | Trepagnier et al. | 701/301 |
| 8,452,506 B2 * | 5/2013 | Groult | 701/70 |
| 8,634,980 B1 | 1/2014 | Urmson et al. | |
| 8,706,394 B2 * | 4/2014 | Trepagnier et al. | 701/301 |
| 8,718,861 B1 | 5/2014 | Montemerlo et al. | |
| 2001/0037927 A1 | 11/2001 | Nagler et al. | |
| 2003/0016804 A1 | 1/2003 | Sheha et al. | |
| 2003/0055554 A1 | 3/2003 | Shioda et al. | |
| 2003/0093209 A1 | 5/2003 | Andersson et al. | |
| 2004/0243292 A1 | 12/2004 | Roy | |
| 2005/0012589 A1 | 1/2005 | Kokubu et al. | |
| 2005/0125154 A1 | 6/2005 | Kawasaki | |
| 2005/0149251 A1 | 7/2005 | Donath et al. | |
| 2005/0273251 A1 | 12/2005 | Nix et al. | |
| 2006/0037573 A1 | 2/2006 | Iwatsuki et al. | |
| 2006/0082437 A1 | 4/2006 | Yuhara | |
| 2006/0089764 A1 | 4/2006 | Filippov et al. | |
| 2006/0089800 A1 | 4/2006 | Svendsen et al. | |
| 2006/0178240 A1 | 8/2006 | Hansel | |
| 2006/0276942 A1 | 12/2006 | Anderson et al. | |
| 2007/0165910 A1 | 7/2007 | Nagaoka et al. | |
| 2007/0225909 A1 | 9/2007 | Sakano | |
| 2007/0239331 A1 | 10/2007 | Kaplan | |
| 2007/0247281 A1 | 10/2007 | Shimomura | |
| 2008/0021628 A1 | 1/2008 | Tryon | |
| 2008/0039991 A1 | 2/2008 | May et al. | |
| 2008/0059015 A1 * | 3/2008 | Whittaker et al. | 701/23 |
| 2008/0059048 A1 | 3/2008 | Kessler et al. | |
| 2008/0084283 A1 | 4/2008 | Kalik | |
| 2008/0120025 A1 | 5/2008 | Naitou et al. | |
| 2008/0120171 A1 | 5/2008 | Ikeuchi et al. | |
| 2008/0147253 A1 * | 6/2008 | Breed | 701/3 |
| 2008/0161987 A1 | 7/2008 | Breed | |
| 2008/0167771 A1 * | 7/2008 | Whittaker et al. | 701/26 |
| 2008/0183512 A1 | 7/2008 | Benzinger et al. | |
| 2008/0188246 A1 | 8/2008 | Sheha et al. | |
| 2008/0195268 A1 | 8/2008 | Sapilewski et al. | |
| 2008/0277183 A1 | 11/2008 | Huang et al. | |
| 2008/0303696 A1 | 12/2008 | Aso et al. | |
| 2008/0306969 A1 | 12/2008 | Mehta et al. | |
| 2009/0005959 A1 | 1/2009 | Bargman et al. | |
| 2009/0082879 A1 | 3/2009 | Dooley et al. | |
| 2009/0115594 A1 | 5/2009 | Han | |
| 2009/0198400 A1 | 8/2009 | Allard et al. | |
| 2009/0248231 A1 | 10/2009 | Kamiya | |
| 2009/0276154 A1 | 11/2009 | Subramanian et al. | |
| 2009/0287367 A1 | 11/2009 | Salinger | |
| 2009/0287368 A1 | 11/2009 | Bonne | |
| 2009/0306834 A1 | 12/2009 | Hjelm et al. | |
| 2009/0319096 A1 | 12/2009 | Offer et al. | |
| 2009/0319112 A1 | 12/2009 | Fregene et al. | |
| 2009/0326799 A1 | 12/2009 | Crook | |
| 2010/0017056 A1 | 1/2010 | Asakura et al. | |
| 2010/0052945 A1 | 3/2010 | Breed | |
| 2010/0066587 A1 * | 3/2010 | Yamauchi et al. | 342/70 |
| 2010/0076640 A1 | 3/2010 | Maekawa et al. | |
| 2010/0079590 A1 | 4/2010 | Kuehnle et al. | |
| 2010/0179720 A1 | 7/2010 | Lin et al. | |
| 2010/0191433 A1 * | 7/2010 | Groult | 701/70 |
| 2010/0205132 A1 | 8/2010 | Taguchi | |
| 2010/0228419 A1 | 9/2010 | Lee et al. | |
| 2010/0241297 A1 | 9/2010 | Aoki et al. | |
| 2010/0253542 A1 | 10/2010 | Seder et al. | |
| 2010/0256836 A1 | 10/2010 | Mudalige | |
| 2011/0071718 A1 | 3/2011 | Norris et al. | |
| 2011/0137520 A1 | 6/2011 | Rector et al. | |
| 2011/0150348 A1 | 6/2011 | Anderson | |
| 2011/0206273 A1 | 8/2011 | Plagemann et al. | |
| 2011/0213511 A1 | 9/2011 | Visconti et al. | |
| 2011/0246156 A1 | 10/2011 | Zecha et al. | |
| 2011/0254655 A1 | 10/2011 | Maalouf et al. | |
| 2012/0053775 A1 | 3/2012 | Nettleton et al. | |
| 2012/0114178 A1 | 5/2012 | Platonov et al. | |
| 2012/0157052 A1 | 6/2012 | Quade | |
| 2012/0277947 A1 | 11/2012 | Boehringer et al. | |
| 2013/0054106 A1 | 2/2013 | Schmudderich et al. | |
| 2013/0179382 A1 | 7/2013 | Fritsch et al. | |
| 2014/0088855 A1 | 3/2014 | Ferguson | |

FOREIGN PATENT DOCUMENTS

| | | |
|---|---|---|
| JP | 09-160643 A | 6/1997 |
| JP | 11282530 A | 10/1999 |
| JP | 2000149188 A | 5/2000 |
| JP | 2000305625 A | 11/2000 |
| JP | 2000-338008 A | 12/2000 |
| JP | 2001-101599 A | 4/2001 |
| JP | 2002236993 A | 8/2002 |
| JP | 2002251690 A | 9/2002 |
| JP | 2003081039 A | 3/2003 |
| JP | 2003162799 A | 6/2003 |
| JP | 2005067483 A | 3/2005 |
| JP | 2005071114 A | 3/2005 |
| JP | 2005-339181 A | 12/2005 |
| JP | 2006322752 A | 11/2006 |

(56) References Cited

FOREIGN PATENT DOCUMENTS

| | | | |
|---|---|---|---|
| JP | 2007001475 A | 1/2007 | |
| JP | 2008117082 A | 5/2008 | |
| JP | 2008152655 A | 7/2008 | |
| JP | 2008170404 A | 7/2008 | |
| JP | 2008290680 A | 12/2008 | |
| JP | 2009053925 A | 3/2009 | |
| WO | 0070941 A1 | 11/2000 | |
| WO | 2001088827 A1 | 11/2001 | |
| WO | 2009028558 A1 | 3/2009 | |
| WO | 2009155228 A1 | 12/2009 | |
| WO | 2011021046 A1 | 2/2011 | |

OTHER PUBLICATIONS

Matthew McNaughton, Motion Planning for Autonomous Driving with a Conformal Spatiotemporal Lattice, Internation COnference on Robotics and Automation, May 9-13, pp. 4889-4895.*

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

"Google Cars Drive Themselves, in Traffic" [online]. [Retrieved Aug. 19, 2011] Retrieved from the internet: <http://www.nytimes.com/2010/10/10/science/l0google.html>, 4 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for the 2007 DARPA Urban Challenge, Dec. 2007, 27 pages.

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

Vincenzo DiLecce and Marco Calabrese, Experimental System to Support Real-Time Driving Pattern Recognition, 2008, pp. 1192-1199.

* cited by examiner

SYSTEMS AND METHODS FOR DETERMINING WHETHER A DRIVING ENVIRONMENT HAS CHANGED

BACKGROUND

An autonomous vehicle may use various computing systems to aid in the transport of passengers from one location to another. In addition, the autonomous vehicle may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the autonomous vehicle) to an autonomous mode (where the autonomous vehicle essentially drives itself) to modes that lie somewhere in between.

The autonomous vehicle may be equipped with various types of sensors in order to detect objects in its environment. For example, the autonomous vehicles may include such sensors as lasers, sonar, radar, cameras, and other sensors that scan and record data from the autonomous vehicle's environment. Sensor data from one or more of these sensors may be used to detect objects and their respective characteristics (position, shape, heading, speed, etc.). This detection and identification is a critical function for the safe operation of the autonomous vehicle.

To navigate an environment confidently and precisely, the autonomous vehicle may rely on a prior stored electronic representation of the environment (e.g., a roadway, a highway, etc.). The electronic representation of the environment may be considered a "map" that identifies such features as lane markings, lane edges, k-rail concrete barriers, lane dividers, road medians, traffic safety cones, and other such features. The autonomous vehicle may store the map for both complex and simple environments.

However, there are times in which these prior stored maps may be out-of-date or inaccurate. For example, there may be construction in the environment or an accident occurs on a roadway. As a result, the lanes of the roadway may be shifted relative to their previously indicated position in the prior stored map. In such circumstances, the autonomous vehicle must still be able to safely navigate without relying on its prior stored map.

BRIEF SUMMARY

This disclosure provides for an apparatus and a method. In one embodiment, the apparatus includes computer-readable memory configured to store first location information corresponding to a first object, the first object having been identified as a primary object for use in determining whether a driving environment has changed, and a processor in communication with the computer-readable memory. The processor may be configured to receive sensor information corresponding to the first object having been detected in the driving environment and obtain second location information for the first object based on the received sensor information. The processor may also be configured to determine a first discrepancy metric by comparing the first location information with the second location information and determine a confidence probability based on the first discrepancy metric. Furthermore, the processor may be configured to determine that the driving environment has changed based on the confidence probability exceeding a confidence probability threshold.

In another embodiment of the apparatus, the first discrepancy metric comprises a maximum deviation metric that indicates a maximum deviation value between the first location information and the second location information.

In a further embodiment of the apparatus, the first discrepancy metric comprises an average deviation metric that indicates an average deviation value between the first location information and the second location information.

In yet another embodiment of the apparatus, the first discrepancy metric comprises an average signed deviation metric that indicates a signed deviation value between the first location information and the second location information.

In yet a further embodiment of the apparatus, the computer-readable memory may be further configured to store third location corresponding to a second object, wherein the second object has been identified as another primary object for use in determining whether the driving environment has change, and the second object is of a different object type than an object type of the first object. In addition, the processor may be further configured to obtain fourth location information for the second object based on the second object being detected in the driving environment, and determine a second discrepancy metric by comparing the third location information with the fourth location information. The processor may also be configured to re-determine the confidence probability based on the second discrepancy metric and the comparison of the confidence probability with the confidence probability threshold.

In another embodiment of the apparatus, the computer-readable memory may be further configured to store a hierarchy of object types, the hierarchy of object types indicating which of the object types are to be used first in determining whether the driving environment has changed, and the processor determines the confidence probability based on the hierarchy of object types.

In a further embodiment of the apparatus, the computer-readable memory may be further configured to store third location information for a second object, wherein the second object has been identified as a secondary object for use in determining whether the driving environment has changed and the second object is of a different object type than an object type of the first object. In addition, the processor may be further configured to obtain fourth location information for the second object based on the second object being detected in the driving environment, determine a second discrepancy metric by comparing the third location information with the fourth location information, and re-determine the confidence probability based on the second discrepancy metric and the comparison of the confidence probability with the confidence probability threshold.

In yet another embodiment of the apparatus, the first location information indicates that the first object is in a first location and the second location information indicates that the second object is in a second location, the second location being a different location than the first location.

In yet a further embodiment of the apparatus, the processor determines the confidence probability based on the first discrepancy metric when the first discrepancy metric exceeds a first discrepancy threshold and a second discrepancy threshold.

In another embodiment of the apparatus, the first location information comprises a first plurality of laser data points obtained from a prior detection of the first object, the second location information comprises a second plurality of laser data points obtained from the detection of the first object, and the processor determines the first discrepancy metric by comparing the first plurality of laser data points with the second plurality of laser data points.

In one embodiment of the method, the method includes receiving sensor information from a sensor, the sensor information corresponding to a first object having been detected in the driving environment, the first object having been identified as a primary object for use in determining whether a driving environment has changed, and obtaining, with a processor in communication with the sensor, second location information for the first object based on the received sensor information. The method may also include determining, with the processor, a first discrepancy metric by comparing first location information stored in a computer-readable memory with the second location information, the first location information corresponding to the first object. The method may also include determining, with the processor, a confidence probability based on the first discrepancy metric, and determining that the driving environment has changed by comparing the confidence probability with a confidence probability threshold.

In another embodiment of the method, the first discrepancy metric comprises a maximum deviation metric that indicates a maximum deviation value between the first location information and the second location information.

In a further embodiment of the method, the first discrepancy metric comprises an average deviation metric that indicates an average deviation value between the first location information and the second location information.

In yet another embodiment of the method, the first discrepancy metric comprises an average signed deviation metric that indicates a signed deviation value between the first location information and the second location information.

In yet a further embodiment of the method, the second object has been identified as another primary object for use in determining whether the driving environment has change, the second object is of a different object type than an object type of the first object, the method further includes obtaining, with the processor, third location information for the second object based on the second object being detected in the driving environment, determining, with the processor, a second discrepancy metric by comparing the third location information with fourth location information for the second object, the fourth location information being stored in the computer-readable memory and corresponding to the second object, and re-determining the confidence probability based on the second discrepancy metric and the comparison of the confidence probability with the confidence probability threshold.

In another embodiment of the method, the method includes determining, with the processor, the confidence probability based on a hierarchy of object types, the hierarchy of object types being stored in the computer-readable memory and indicating which of the object types are to be used first in determining whether the driving environment has changed.

In a further embodiment of the method, the second object has been identified as a secondary object for use in determining whether the driving environment has changed, the second object is of a different object type than an object type of the first object, and the method further includes obtaining, with the processor, third location information for the second object based on the second object being detected in the driving environment, determining, with the processor, a second discrepancy metric by comparing the third location information with fourth location information, the fourth location information being stored in the computer-readable memory and corresponding to the second object, and re-determining, with the processor, the confidence probability based on the second discrepancy metric and the comparison of the confidence probability with the confidence probability threshold.

In yet another embodiment of the method, the first location information indicates that the first object is in a first location and the second location information indicates that the second object is in a second location, the second location being a different location than the first location.

In yet a further embodiment of the method, the method includes determining, with the processor, the confidence probability based on the first discrepancy metric when the first discrepancy metric exceeds a first discrepancy threshold and a second discrepancy threshold.

In another embodiment of the method, the first location information comprises a first plurality of laser data points obtained from a prior detection of the first object, the second location information comprises a second plurality of laser data points obtained from the detection of the first object, and the method further includes determining, with the processor, the first discrepancy metric by comparing the first plurality of laser data points with the second plurality of laser data points.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This disclosure generally relates to an autonomous driving computer system configured to determine whether a driving environment of a vehicle has changed.

The autonomous driving computer system may have stored the previous locations of one or more objects from a driving environment. The autonomous driving computer system may then compare the prior locations of those one or more objects with the current locations of those one or more objects as they then are detected in the driving environment.

As an example, the autonomous driving computer system may store the previous locations of the left and right lane edge boundaries, and then, while the vehicle is subsequently navigating the driving environment, the autonomous driving computer system may compare the location of the detected left and right lane edge boundaries with the stored previous locations. If there is a significant difference between the locations of these two sets of boundaries, the autonomous driving computer system may conclude that stored detailed map information map is no longer accurate. The autonomous driving computer system may then stop relying on its stored detailed map information and, instead, rely on other information or feedback to navigate the driving environment (e.g., using a wireless connection to obtain detailed map information or requesting manual operation of the vehicle).

Figure 1:
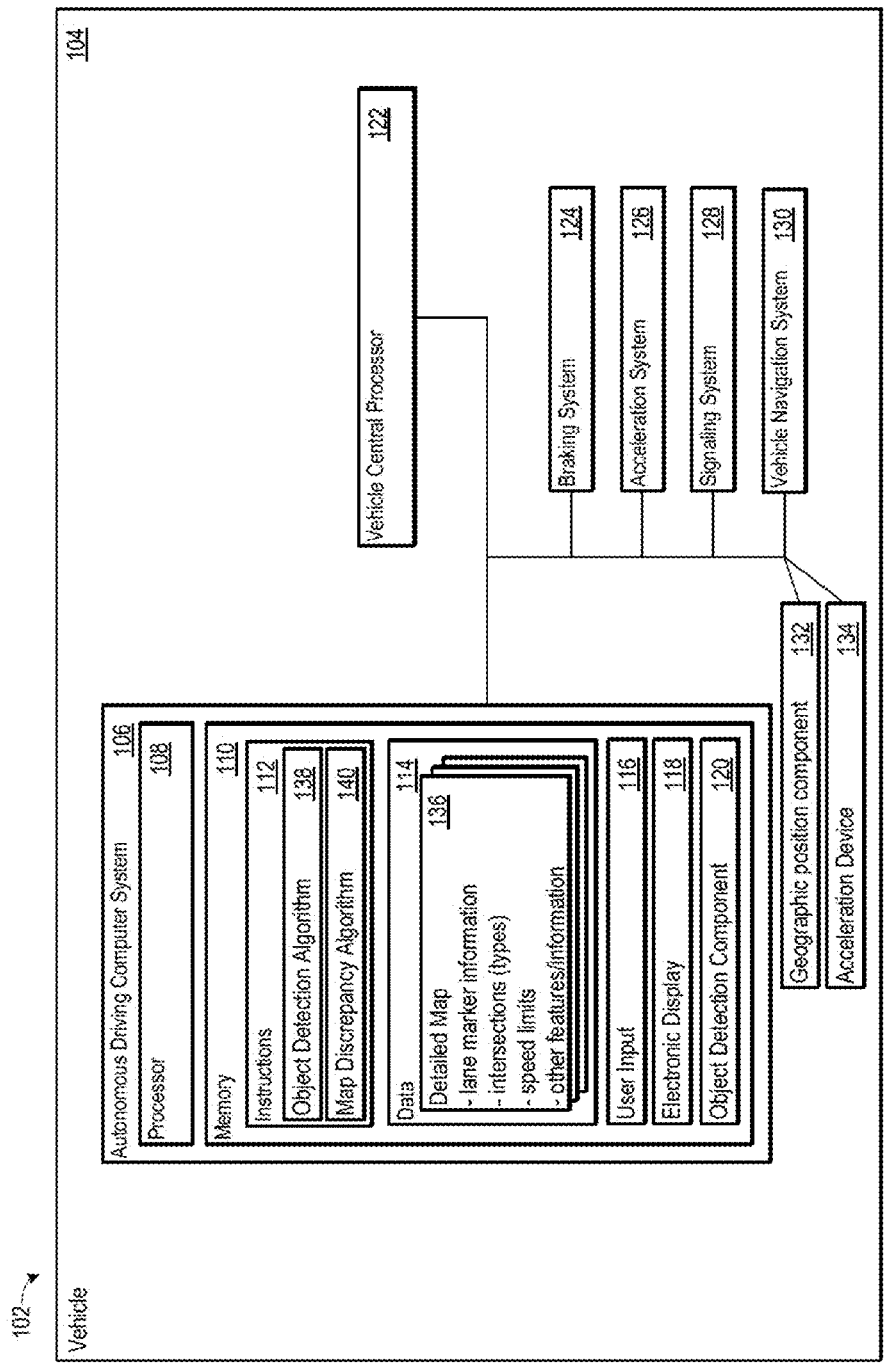
FIG. 1 illustrates an example of an autonomous driving system in accordance with aspects of the disclosure.

FIG. 1 illustrates an example of an autonomous driving system 102 in accordance with one aspect of the disclosure. The autonomous driving system 102 may include a vehicle 104 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 106 containing a processor 108, a memory 110 and other components typically present in general purpose computers.

The memory 110 may store information accessible by the processor 108, including one or more instructions 112 and data 114 that may be executed or otherwise used by the processor 108. The memory 110 may be of any type capable of storing information accessible by the processor, including a computer-readable medium, or other medium that stores data that may be read with the aid of an electronic device, such as a hard-drive, memory card, read-only memory ("ROM"), random access memory ("RAM"), optical disks (e.g., CD-ROMs and DVDs), as well as other write-capable and read-only memories. Systems and methods may include different combinations of the foregoing, whereby different portions of the instructions and data are stored on different types of media.

The instructions 112 may be any set of instructions to be executed directly (such as machine code) or indirectly (such as scripts) by the processor 108. For example, the instructions 112 may be stored as computer code on a computer-readable medium. In that regard, the terms "instructions" and "programs" may be used interchangeably herein. The instructions 112 may be stored in object code format for direct processing by the processor 108, or in any other computer language including scripts or collections of independent source code modules that are interpreted on demand or compiled in advance. Functions, methods and routines of the instructions are explained in more detail below.

The data 114 may be retrieved, stored or modified by the processor 108 in accordance with the instructions 112. For instance, although the system and method is not limited by any particular data structure, the data 114 may be stored in computer registers, in a relational database as a table having a plurality of different fields and records, extensible markup language ("XML") documents or flat files. The data may also be formatted in any computer-readable format.

By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 114 may comprise any information sufficient to identify the relevant information, such as numbers, descriptive text, proprietary codes, references to data stored in other areas of the same memory or different memories (including other network locations) or information that is used by a function to calculate the relevant data.

The processor 108 may be any conventional processor, such as commercially available central processing units ("CPUs"). Alternatively, the processor may be a dedicated device such as an application-specific integrated circuit ("ASIC"). Although FIG. 1 functionally illustrates the processor 108, the memory 110, and other elements of the computer 106 as being within the same block, it will be understood that the processor 108 and the memory 110 may actually comprise multiple processors and memories that may or may not be stored within the same physical housing. For example, the memory 110 may be a hard drive or other computer-readable media located in a housing different from that of the computer 106. Accordingly, references to a processor or a computer will be understood to include references to a collection of processors or computers or memories that may or may not operate in parallel. Rather than using a single processor to perform the steps described herein some of the components, such as steering components and deceleration components, may each have their own processor that only performs calculations related to the component's specific function.

In various aspects described herein, the processor 108 may be located remotely from the vehicle 104 and communicate with the vehicle 104 wirelessly. In other aspects, some of the processes described herein are executed on a processor disposed within the vehicle 104 while others are executed by a remote processor, including taking the steps necessary to execute a single maneuver.

The computer 106 may include all of the components normally used in connection with a computer such as a CPU, memory (e.g., RAM and internal hard drives) storing the data 114 and instructions such as a web browser, an electronic display 118 (e.g., a monitor having a screen, a small LCD touch-screen or any other electrical device that is operable to display information), a user input 116 (e.g., a mouse, keyboard, touch screen and/or microphone, etc.), as well as various sensors (e.g., a video camera) for gathering the explicit (e.g., a gesture) or implicit (e.g., "the person is asleep") information about the states and desires of a person.

Figure 2:
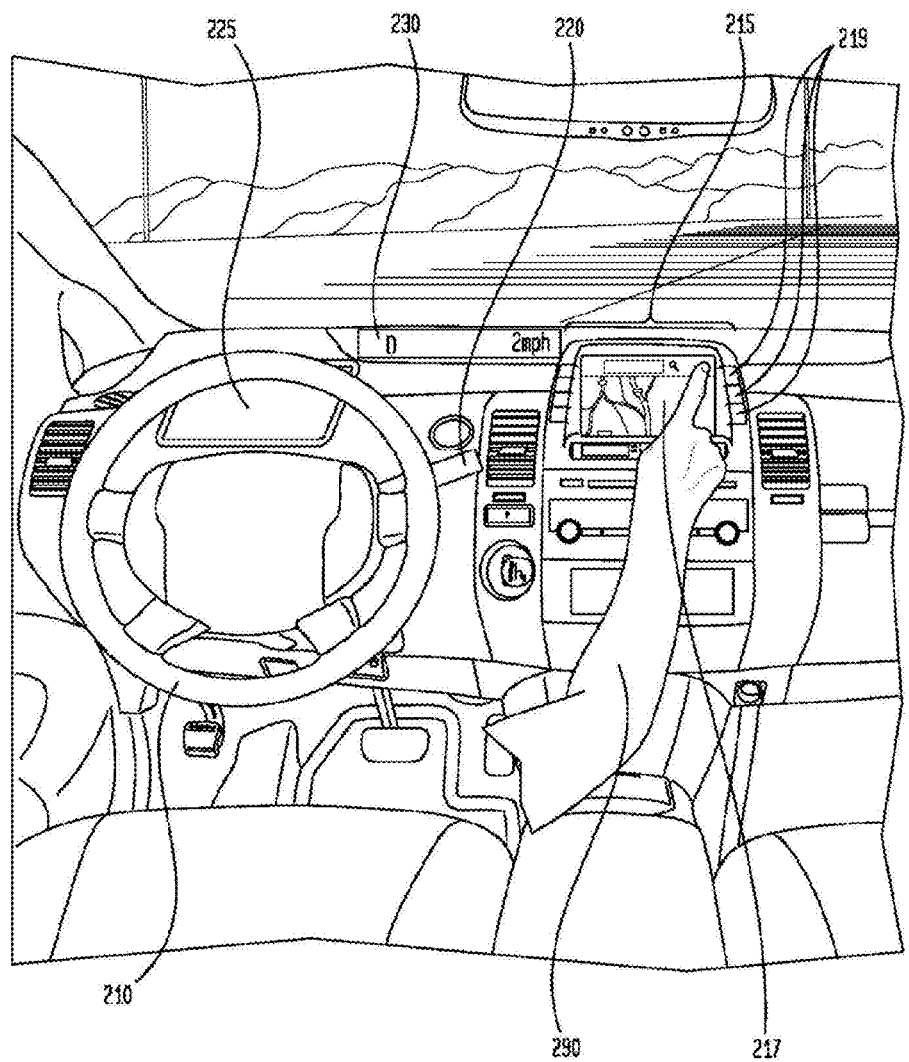
FIG. 2 illustrates an example of an interior design of an autonomous vehicle.

In one example, the computer 106 may be an autonomous driving computing system incorporated into the vehicle 104. FIG. 2 depicts an exemplary design of the interior of an autonomous vehicle. The autonomous vehicle 104 may include all of the features of a non-autonomous vehicle, for example: a steering apparatus, such as steering wheel 210; a navigation display apparatus, such as navigation display 215; and a gear selector apparatus, such as gear shifter 220. The vehicle 104 may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 106.

The vehicle 104 may also include one or more additional displays. For example, the vehicle 104 may include a display 225 for displaying information regarding the status of the autonomous vehicle 104 or its computer. In another example, the vehicle 104 may include a status indicating apparatus such as status bar 230, to indicate the current status of vehicle 104. In the example of FIG. 2, the status bar 230 displays "D" and "2 mph" indicating that the vehicle 104 is presently in drive mode and is moving at 2 miles per hour. In that regard, the vehicle 104 may display text on an electronic display, illuminate portions of the vehicle 104, such as the steering wheel 210, or provide various other types of indications.

The autonomous driving computing system 106 may communicate with various components of the vehicle 104. Referring back to FIG. 1, the computer 106 may be in communication with a vehicle central processor 122 and may send and receive information from the various systems of vehicle 104. For example, the computer 106 may send and receive information from a braking system 124, an acceleration system 126, a signaling system 128, and/or a navigation system 130 in order to control the movement, speed, etc., of the vehicle 104. In addition, when engaged, the computer 106 may control some or all of these functions of the vehicle 104 and thus be fully or merely partially autonomous. It will be understood that although various systems and the computer 106 are shown within the vehicle 104, these elements may be external to the vehicle 104 or physically separated by large distances.

The vehicle may also include a geographic position component 132 in communication with the computer 106 for determining the geographic location of the vehicle 104. For example, the position component may include a GPS receiver to determine the vehicle's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around, which may be determined with less noise than absolute geographical location.

The vehicle may also include other features in communication with computer 106, such as an accelerometer, gyroscope or another direction/speed detection device 134 to determine the direction and speed of the vehicle or changes thereto. By way of example only, device 134 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 106, other computers and combinations of the foregoing.

The computer may control the direction and speed of the vehicle by controlling various components. By way of example, if the vehicle is operating in a completely autonomous mode, the computer 106 may cause the vehicle 104 to accelerate (e.g., by increasing fuel or other energy provided to the engine), decelerate (e.g., by decreasing the fuel supplied to the engine or by applying brakes) and change direction (e.g., by turning the front two wheels).

The autonomous driving computer system 106 may also include an object detection component 120 for detecting objects external to the vehicle 104. Examples of objects external to the vehicle 104 may include other vehicles, obstacles in a roadway, traffic signals, signs, trees, etc. The object detection component 120 may include one or more detection devices such as lasers, sonar, radar, cameras or any other detection devices that may record data, which then may be processed by computer 106. For example, if the vehicle 104 is a small passenger vehicle, the small passenger vehicle may include a laser mounted on the roof or other convenient location.

Figure 3:
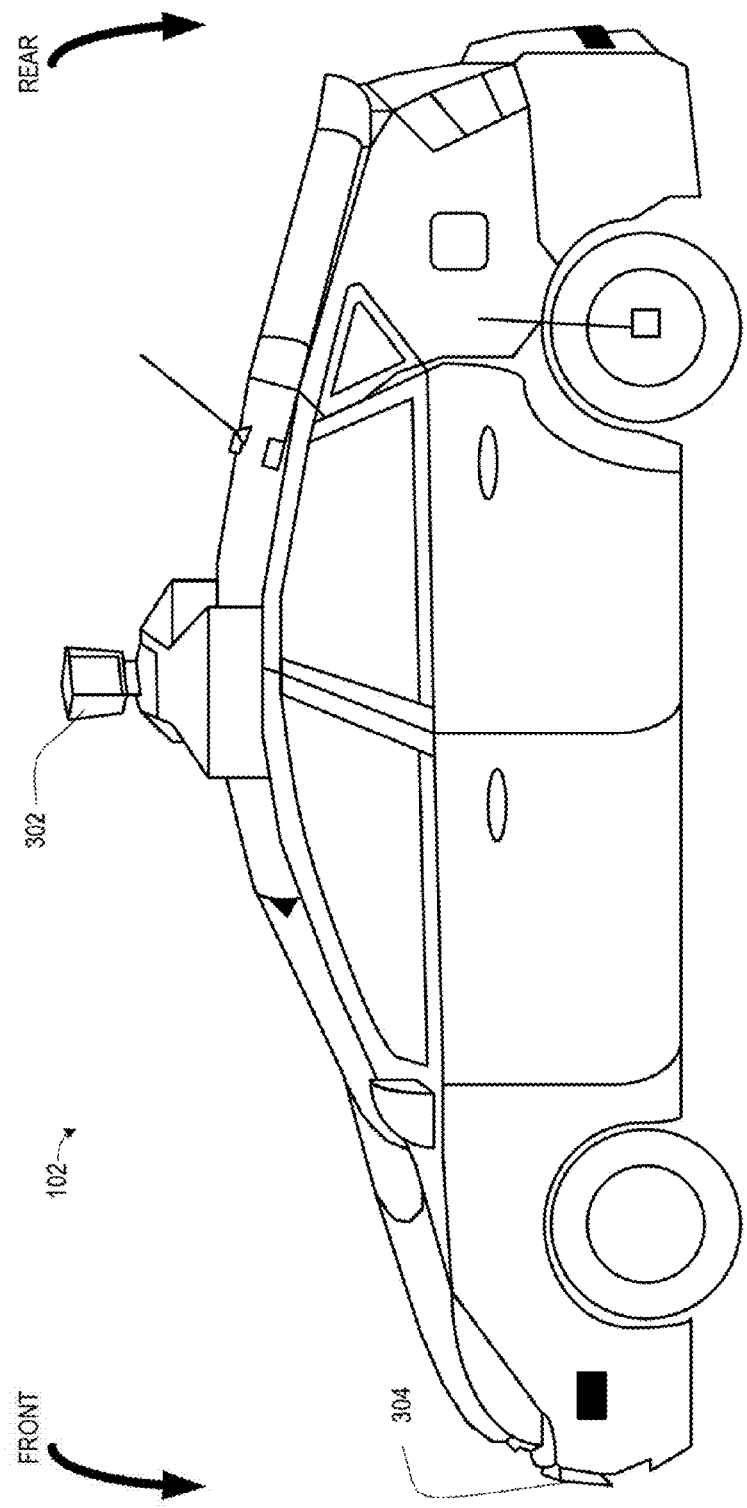
FIG. 3 illustrates an example of the exterior of the autonomous vehicle in accordance with aspects of the disclosure.

FIG. 3 illustrates an example of detection devices mounted on the vehicle 104. In this example, the sensors of the vehicle 104 may include lasers 302 and 304, mounted on the front and top of the vehicle, respectively. The lasers 302,304 may include commercially available lasers such as the Velodyne HDL-64 or other models. The lasers 302,304 may include more than one laser beam; for example, a Velodyne HDL-64 laser may include 64 beams. In one example, the beams of laser 304 may have a range of 150 meters, a thirty-degree vertical field of view, and a thirty-degree horizontal field of view. The beams of laser 302 may have a range of 50-80 meters, a thirty-degree vertical field of view, and a 360-degree horizontal field of view. It will be understood that other lasers having different ranges and configurations may also be used. The lasers 302,304 may provide the vehicle 104 with range and intensity information that the autonomous driving computer system 106 may use to identify the location and distance of various objects in the vehicle's surroundings. In one example, one or more of the lasers 302,304 may measure the distance between the vehicle 104 and the object surfaces facing the vehicle 104 by spinning on its axis and changing its pitch.

The aforementioned detection devices (i.e., sensors) may allow the vehicle 104 to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be used.

In addition to the sensors described above, the autonomous driving computer system 106 may also use input from one or more sensors found in a non-autonomous vehicle. For example, these one or more sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors may provide data that is processed in real-time. For example, these sensors may continuously update their output to reflect the environment being sensed at or over a range of time. In addition, these sensors may continuously or, as-demanded, provide that updated output to an on-board vehicle computer (e.g., the vehicle central processor 122), which may then provide this information to the autonomous driving computer system 106, so that the autonomous driving computer system 106 can determine whether the vehicle's then-current direction or speed should be modified in response to the sensed environment.

In addition to processing data provided by the various sensors, the autonomous driving computer system 106 may rely on environmental data that was obtained at a previous point in time and is expected to persist regardless of the vehicle's presence in the environment. For example, returning to FIG. 1, the data 114 may include detailed map information 136, e.g., highly detailed maps identifying the shape and elevation of roadways, intersections, crosswalks, speed limits, traffic signals, buildings, signs, real time traffic information, or other such objects and information.

The detailed map information 136 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The detailed map information 136 may also include information about previously identified core or primary objects relied upon by the autonomous driving computer system 106 in determining whether a driving environment (e.g., a road, highway, etc.) has changed. Lane markers, as discussed above, are one example of a primary object. However, other primary objects may include k-rail concrete barriers, traffic safety cones, billboards, and other such objects. Individual objects, such as a house, restaurant, rest stop, or other such object, may also be identified as a core object.

The detailed map information 136 may also include the prior identification of object types as core object types. For example, while a specific k-rail concrete barrier or billboard may be identified as a primary object, the detailed map information 136 may be configured such that all k-rail concrete barriers and/or all billboards are identified as primary object types.

Further still, different driving environments may have different primary object types. For example, traffic safety cones may be identified as a primary object type for one road, such as U.S. Route 1, but traffic safety cones may not be identified as a primary object type for another road, such as Interstate 95.

Moreover, object types and/or individual objects may be hierarchically classified. Thus, a first object type, such as lane markers, may be considered a primary (i.e., core) object type, and a second object type, such as k-rail concrete barriers, may be considered a secondary object type. As discussed below, the hierarchical classification of object types and/or objects may be used in evaluating whether there is an actual discrepancy in the detailed map information 136 versus the driving environment of the autonomous vehicle 104. Further still, different driving environments may have different hierarchical classifications (e.g., traffic safety cones may be considered a primary object type in one driving environment, but may be considered a secondary object type in a different, second driving environment).

The identification of primary object types for determining discrepancies in the detailed map information 136 may be done in a variety of ways. In one example, the identification of primary object types may be performed by manually programming the autonomous driving computer system 106. The user may configure the autonomous driving computer system 106 to identify certain object types, such as lane edges, lane reflectors, etc., as primary object types and other objects, such as traffic safety cones and other objects, as secondary object types. Moreover, the user may configure the autonomous driving computer system 106 to identify specific objects (as opposed to object types) as primary objects. One example may be a well-known object, such as a restaurant, bridge, or other such object. It is also possible that the autonomous driving computer system 106 is configured such that there is no distinction between a primary object type and a secondary object type.

In another example, the identification of primary object types may be performed automatically. The autonomous driving computer system 106 may be configured to recognize various objects, and the autonomous driving computer system 106 may assign object classifications (e.g., primary, secondary, etc.) to the objects based on their object type. Alternatively, or in addition, the autonomous driving computer system 106 may be configured to identify an object as a primary or core object based on another set of criteria, such as the object's visibility to one or more of the sensors in communication with the autonomous driving computer system 106.

Figure 4A:
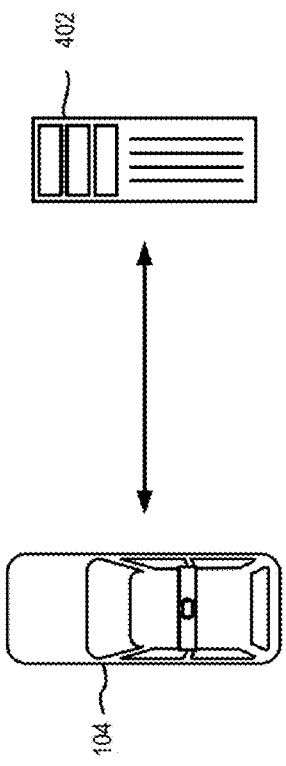
FIGS. 4A-4B illustrate examples of transmitting and receiving data in accordance with aspects of the disclosure.
Figure 4B:
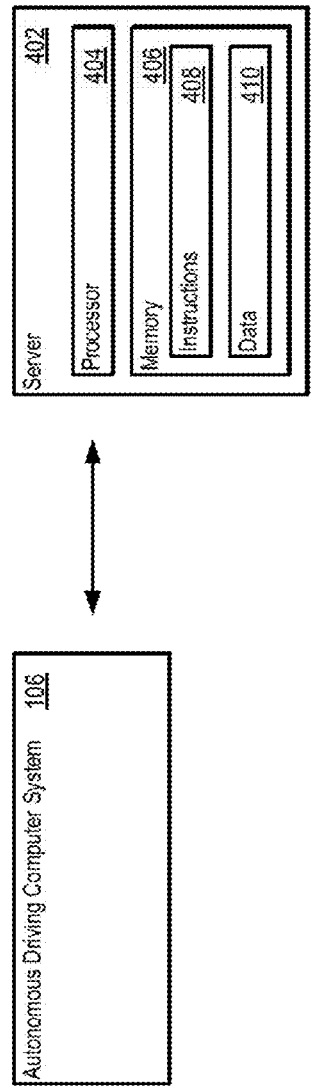

FIGS. 4A-4B illustrate examples of transmitting and/or receiving data to and/or from the vehicle 104 and the autonomous driving computer system 106. In one example, data from autonomous driving computer system 106 may be transmitted via a network to a server 402 for further processing. The network, and intervening nodes, may comprise various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing. Such communication may be facilitated by any device capable of transmitting data to and from other computers, such as modems and wireless interfaces. In another example, data may be transferred by storing it on memory that may be accessed by or connected to the autonomous driving computer system 106 and the server 402.

In one example, the server 402 may comprise a plurality of computers, e.g., a load balancing server farm, that exchange information with different nodes of a network for the purpose of receiving, processing and transmitting the data from the autonomous driving computer system 106. The server 402 may be configured similarly to the autonomous driving computer system 106 (i.e., having a processor 404, a memory 406, instructions 408, and data 410).

Figure 5:
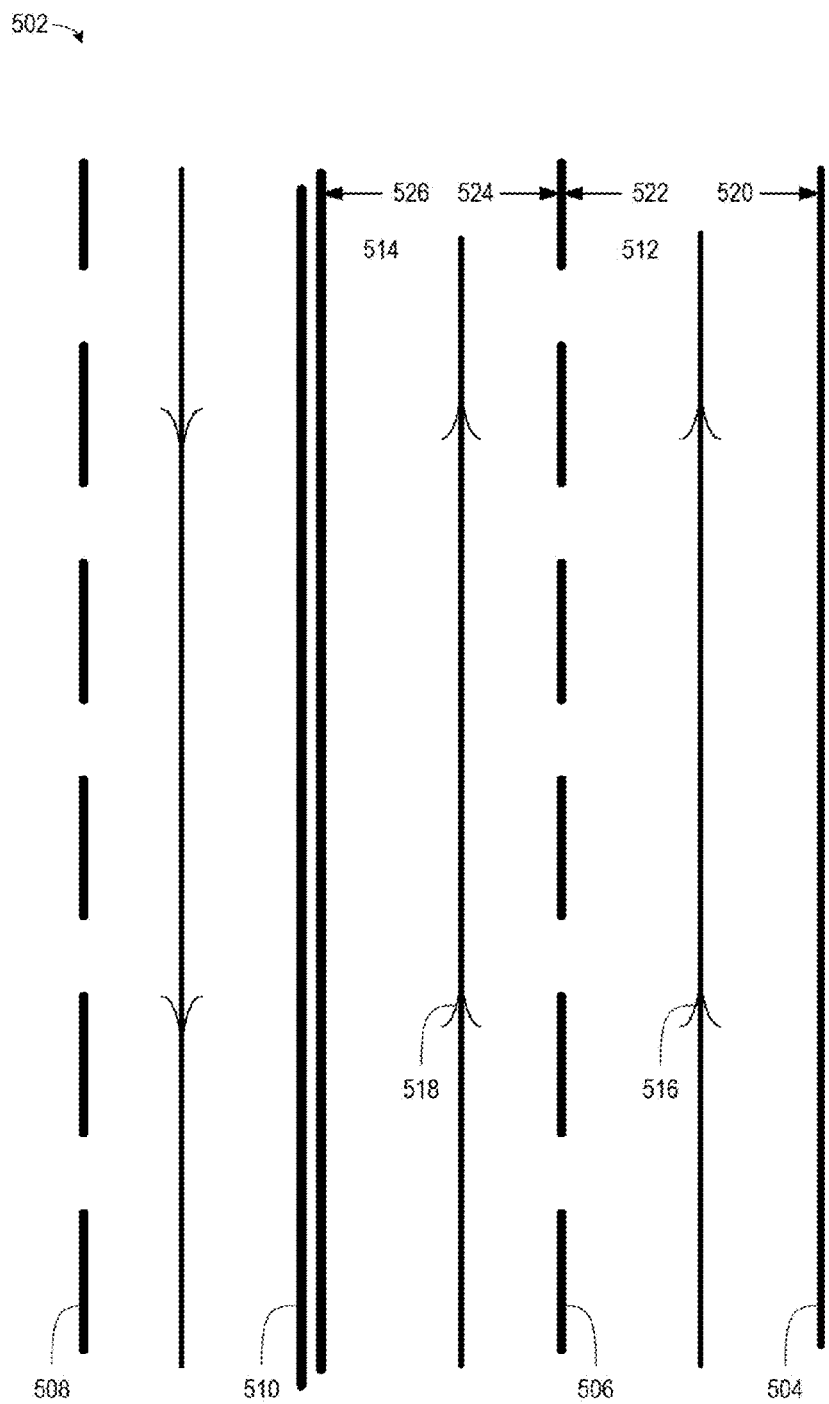
FIG. 5 illustrates an example of a detailed map that may be stored by the autonomous vehicle in accordance with aspects of the disclosure.

FIG. 5 illustrates an example of a detailed map 502 including an exemplary section of roadway (as well as information outside of the range of the laser). The detailed map 502 of the section of roadway may include such information as information about a solid lane line 504, broken lane lines 506, 508, and double solid lane lines 510. These lane lines may define lanes 512 and 514. Each lane may be associated with a rail 516, 518 which may indicate the direction in which a vehicle should generally travel in the respective lane. For example, a vehicle may follow rail 518 when driving along lane 514. In this example, the lane 512 may be bounded by a right lane line 504 and a left lane line 506, and the lane 514 is bounded by a right lane line 506 and a left lane line 510. The edges for lane 512 are edges 520, 522 while the edges for lane 514 are edges 524, 526.

In the example shown in FIG. 5, the detailed map information may be depicted as an image-based map. However, the map information need not be entirely or completely image-based (e.g., raster-based). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The autonomous driving computer system 106 may also receive or transfer information to and from other computers. For example, the detailed map information 136 stored by the memory 110 may be received or transferred from other computers. Moreover, the sensor data collected from the sensors of the vehicle 104 may be transferred to another computer for processing as described herein.

Referring back to FIG. 1, the instructions 112 may include various algorithms for determining whether a driving environment (e.g., a road, a highway, a street, etc.) has changed since the driving environment information was last included in the detailed map information 136. The instructions 112 may include one or more object detection algorithms 138 and one or more map discrepancy algorithms 140 for determining whether such changes have occurred.

The object detection algorithm 138 may facilitate the detection of objects by the autonomous driving computer system 106. For example, the object detection algorithm 138 may process laser scan data describing the intensity and location information of objects within range of the laser in order to produce a set of data points. As mentioned previously, objects detected by the laser may include k-rail concrete barriers, traffic safety cones, lane markings, lane reflectors, pedestrians, and other such objects.

The objects detected by the object detection algorithm 138 may be used in determining whether the road environment has changed since the last update to the detailed map information 136. For example, the detailed map information 136 may have been updated in January, but road construction in April may have changed the layout or number of travelable road lanes. Thus, the objects detected by the object detection algorithm 138 may be compared with objects previously detected and identified in the detailed map information 136 to determine whether the detailed map information 136 is still accurate.

Furthermore, not every object detected by the object detection algorithm 138 may be used in determining whether the detailed map information 136 is still accurate. As discussed previously, the autonomous driving computer system 106 may initially determine whether the driving environment has changed based on the detection of core/primary objects.

In detecting objects using the object detection algorithm 138, each beam of the laser may be associated with a respective subset of data points. For a single beam, the subset of data points may be further divided into sections. For each section, the average intensity and standard deviation may be used to determine a threshold intensity. The data points may then be generated by comparing the intensity of each data point to the threshold intensity for the section in which the data point appears and based on the elevation of the data point relative to the roadway surface. This algorithm may also be stored at the vehicle 104, computer 402 or both.

After detecting an object and estimating its location (discussed below with reference to FIGS. 9-10), The autonomous driving computer system 106 may invoke a map discrepancy algorithm 140 to determine whether there is a discrepancy in the previously acquired detailed map information 136 and the driving environment of the autonomous vehicle 104. More specifically, the autonomous driving computer system 106 may use the map discrepancy algorithm 140 to determine whether the detailed map information 136 is still accurate based on objects detected using the object detection algorithm 138.

In general, the map discrepancy algorithm 140 may compare the location of an object detected by the object detection algorithm 138 with a corresponding location in the detailed map information 136. The absence or presence of the detected object in the detailed map information 136 may indicate whether the driving environment has changed. For example, suppose that the autonomous vehicle 104 has detected a k-rail concrete barrier as an object in the driving environment. The absence of the k-rail concrete barrier from a corresponding location in the detailed map information 136 may indicate that the driving environment has changed. Similarly, the change in location of the detected k-rail concrete barrier (e.g., measured in feet, inches, etc.) may indicate that a change in the driving environment has occurred.

Another example of identifying a potential discrepancy is comparing the location of detected lane markings with the corresponding location of the lane markings in the previously acquired detailed map information 136. As discussed below with reference to FIGS. 9-10, the autonomous driving computer system 106 may initially detect and estimate the location of lane markings in a driving environment, and may then compare those estimated locations with the previously detected location of those lane markings. Mismatches or detected changes in the location of the lane markings, explained further below, may indicate that the driving environment has changed.

Further still, the map discrepancy algorithm 140 may be configured to perform a discrepancy analysis using the location of the primary objects and/or primary object types before other objects or object types. The map discrepancy algorithm 140 may first use this primary group of objects and/or object types to determine whether there are discrepancies in the detailed map information 136. Where the discrepancies are slight or there is uncertainty whether there is actually a discrepancy, the map discrepancy algorithm 140 may leverage a hierarchical classification of objects and/or object types to determine whether a discrepancy exists. For example, lane markings may be considered a primary object type, but if the map discrepancy algorithm 140 is unable to conclusively determine that a discrepancy exists based on the detected locations of the lane markings, the map discrepancy algorithm 140 may analyze the detected location of k-rail concrete barriers (a possible secondary object type) and/or the detected location of traffic safety cones (a possible tertiary object type). In this manner, the map discrepancy algorithm 140 may proceed through the hierarchically classified objects and/or object types to determine whether a driving environment has changed.

In addition to the operations described above and illustrated in the figures, various operations will now be described. It should be understood that the following operations need not be performed in the precise order described below. Rather, various steps or operations may be handled in a different order or simultaneously, and steps or operations may also be added or omitted.

Figure 6:
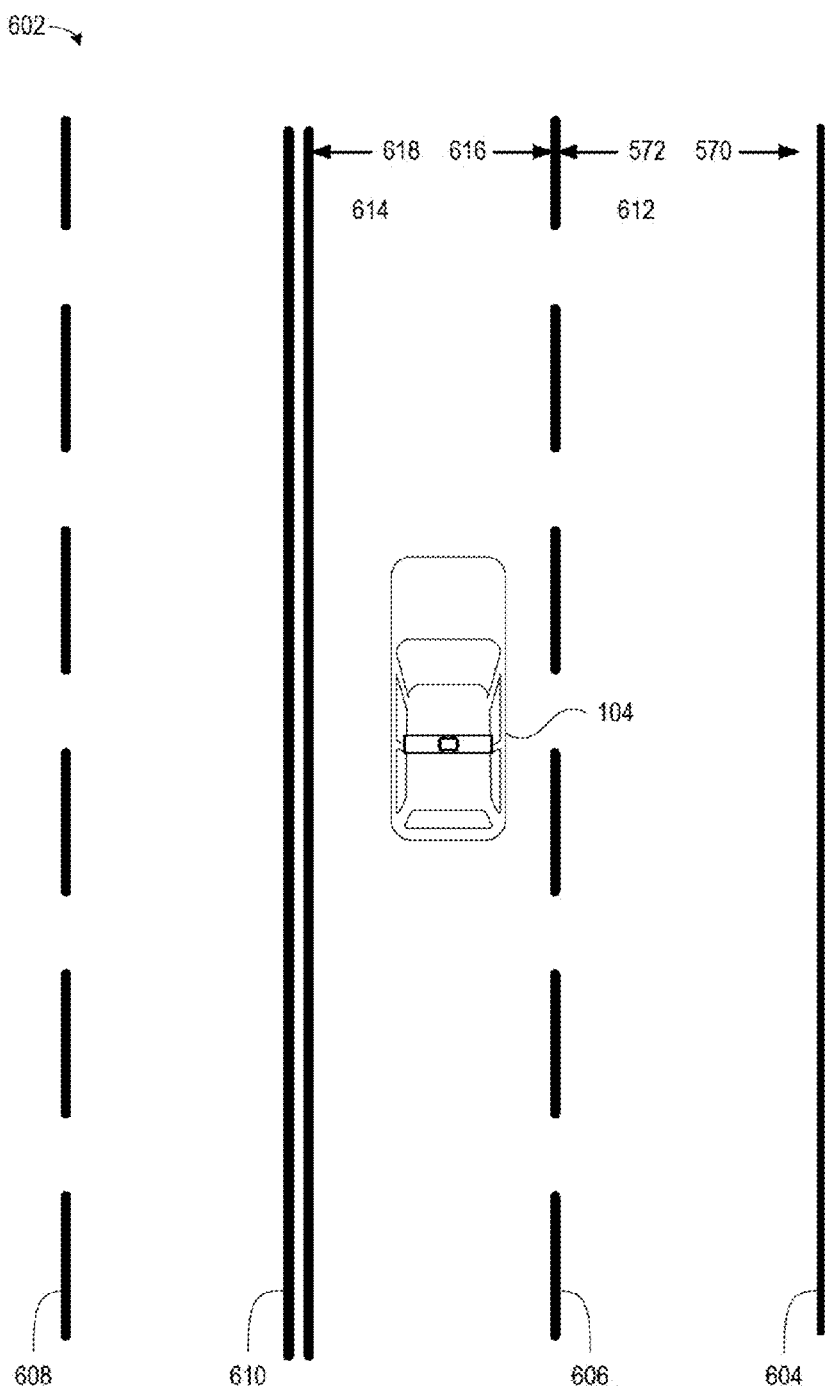
FIG. 6 illustrates an example of a vehicle equipped with the autonomous driving computer system in a driving environment according to aspects of the disclosure.

FIG. 6 illustrates an example of the vehicle 104 on a section of a roadway 602 corresponding to the detailed map information of FIG. 5. As discussed previously, the vehicle 104 may be equipped with one or more object detection components, such as a top-mounted laser 302 and/or a front-mounted laser 304. Other object detection components may include a radar sensor, an optical camera, or the like. As shown in FIG. 6, the roadway 602 may include a solid lane line 604, broken lane lines 606 and 608, double lane lines 610, and lanes 612 and 614. The lane 614 may be defined As the vehicle 104 moves through the driving environment (i.e., the roadway 602), the autonomous driving computer system 106 may collect data points, including range and intensity information, from objects detected within the driving environment from several directions and/or at different times. For example, each data point may include an intensity value indicative of the reflectivity of an object from which the light was received by the laser as well as location information.

The laser scan data collected by the autonomous driving computer system 106 may be processed locally and/or remotely. For example, the collected laser scan data may be processed by the autonomous driving computer system 106 and/or the server 402 to generate geographic location coordinates. These geographic location coordinates may include GPS latitude and longitude coordinates (x,y) with an elevation component (z), or may be associated with other coordinate systems. The result of this processing is a set of data points. Each data point of this set may include an intensity value indicative of the reflectivity of the object from which the light was received by the laser as well as location information: (x,y,z).

Figure 7:
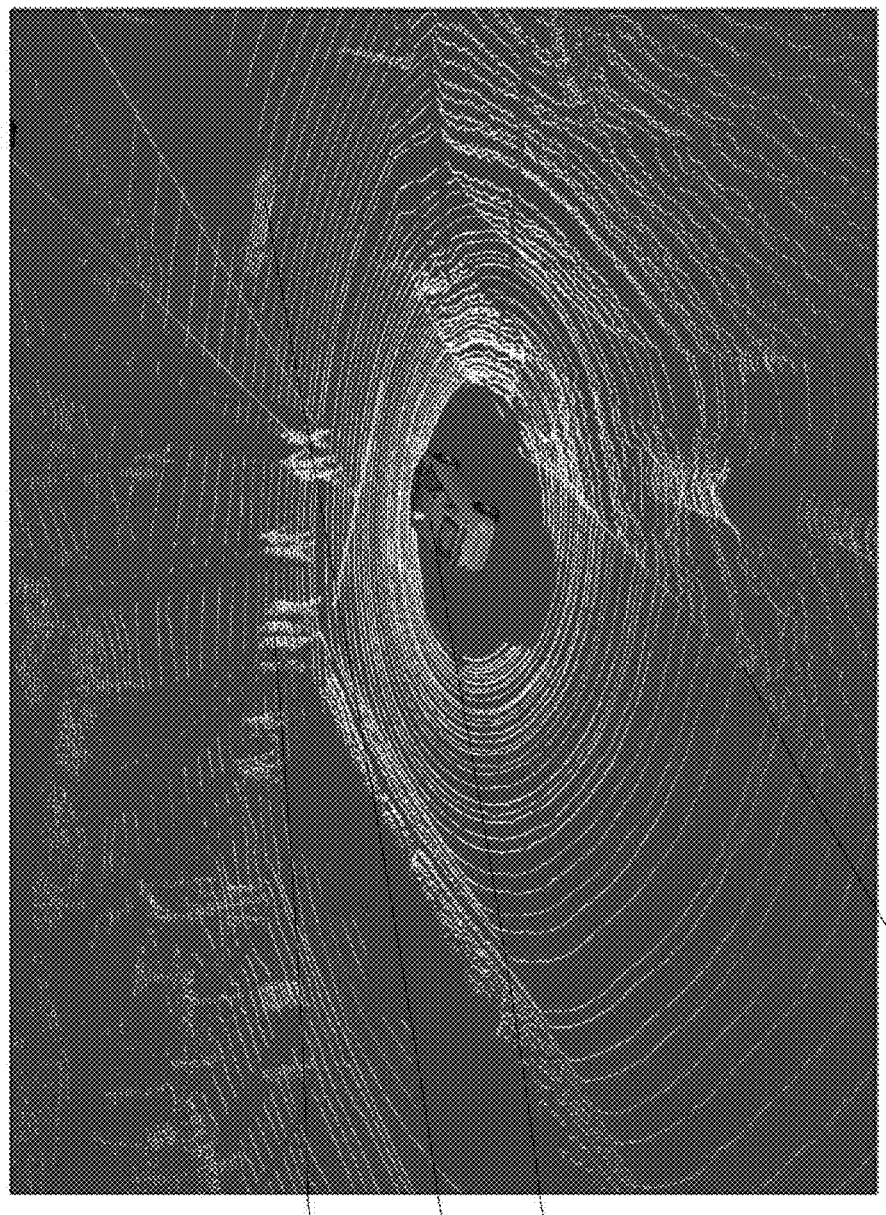
FIG. 7 depicts an exemplary image of the vehicle approaching an intersection according to aspects of the disclosure

FIG. 7 depicts an exemplary image 702 of the vehicle 104 approaching an intersection according to aspects of the disclosure. The image 702 may be generated from the laser scan data collected by the vehicle's lasers (e.g. laser 302 and/or laser 304) for a single 360° scan of the vehicle's surroundings, for example, using the data points of all of the beams of the collecting laser(s). The white lines represent how the laser "sees" its surroundings. When the data points of a plurality of beams are considered together, the data points may indicate the shape and three-dimensional (3D) location (x,y,z) of other items in the vehicle's surroundings. For example, the laser scan data may indicate the outline, shape and distance from vehicle 104 of various objects such as people 704, vehicles 706, and curb 708. Although not shown in the image 702 of FIG. 7, other objects that may be detected by the vehicle 104 may include k-rail concrete barriers, traffic safety cones, billboards, highway bridges, and other such objects.

Figure 8:
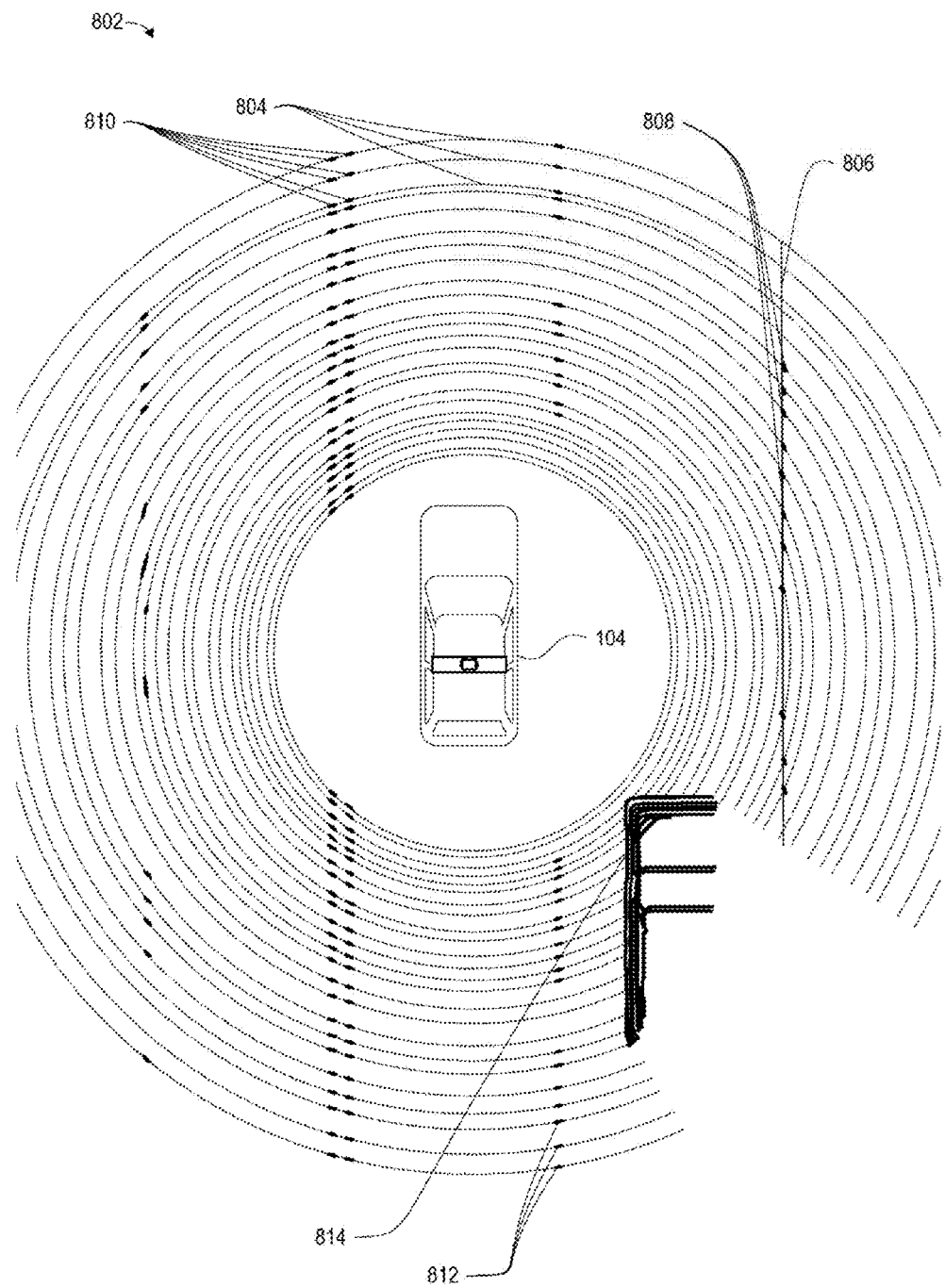
FIG. 8 illustrates an example of scan data collected by the autonomous driving computer system according to aspects of the disclosure.

FIG. 8 depicts another example 802 of laser scan data collected while the vehicle 104 is driven along roadway 602 of FIG. 6 (and also that depicted in map information 502 of FIG. 6). In the example of FIG. 8, the vehicle 104 is depicted surrounded by laser lines 804 indicating the area around the vehicle scanned by a laser (e.g., laser 302). Each laser line may represent a series of discrete data points from a single beam. Data points from more highly reflective features such as lane lines, white paint, reflectors, traffic safety cones, or those with retroreflective properties may have a greater intensity than less reflective features. In this example, reference line 806 connects the data points 808 associated with a solid lane line. The reference line 806 may not be part of the laser data.

FIG. 8 also includes data points 810 generated from light reflecting off of the double lane lines 610 (shown in FIG. 6) as well as distance and data points 812 generated form light reflecting off of the broken lane line 606 (shown in FIG. 6). In addition to features of the roadway 602, the laser scan data of FIG. 8 may include data points generated from the laser reflecting off other objects, such as a vehicle 814, a traffic safety cone (not shown), a k-rail concrete barrier (not shown), or any other object in the driving environment (i.e., the roadway 602).

Using the data points collected by the autonomous driving computer system 106, the system 106 may determine an initial estimate for the location of an object to be used in determining whether there is a discrepancy in the detailed map information 136. For example, the autonomous driving computer system 106 may determine an edge of one or more of the lane lines (i.e., a primary object) based on the collected data points. Referring back to FIG. 6, if vehicle 104 is being driven in lane 614, the relevant edges for this lane may be those associated with double lane lines 610 and lane line 606, in other words, edges 616 and 618. Thus, the computer may generate an initial estimate for edge 616 and/or edge 618.

The following examples are related to single edge 616 for a single lane line, though these steps may be repeated for other edges as well. In one example, a previous estimate of the location of the same or a different edge of the same lane line may be used as an initial estimate. In this example, the autonomous driving computer system 106 may reference the previously stored detailed map information 136 in generating the initial estimate. The autonomous driving computer system 106 may reference the previously stored detailed map information 136 even in instances where the driving environment has changed (e.g., one or more of the lanes have been shifted or added/removed). More particularly, the autonomous driving computer system 106 may identify the pertinent section of the detailed map information 136 based on the location of the vehicle 104 (or laser) when the laser scan data was collected and/or determined from various geographic positioning devices such as the geographic positioning component 132. To generate the initial estimate, the autonomous driving computer system 106 may first cluster generated lane marker data points, extract a general shape, and then use this general shape as an initial estimate for the lane edge. An initial estimate may also be randomly generated, for example using a random sample consensus ("RANSAC") algorithm.

Figure 9:
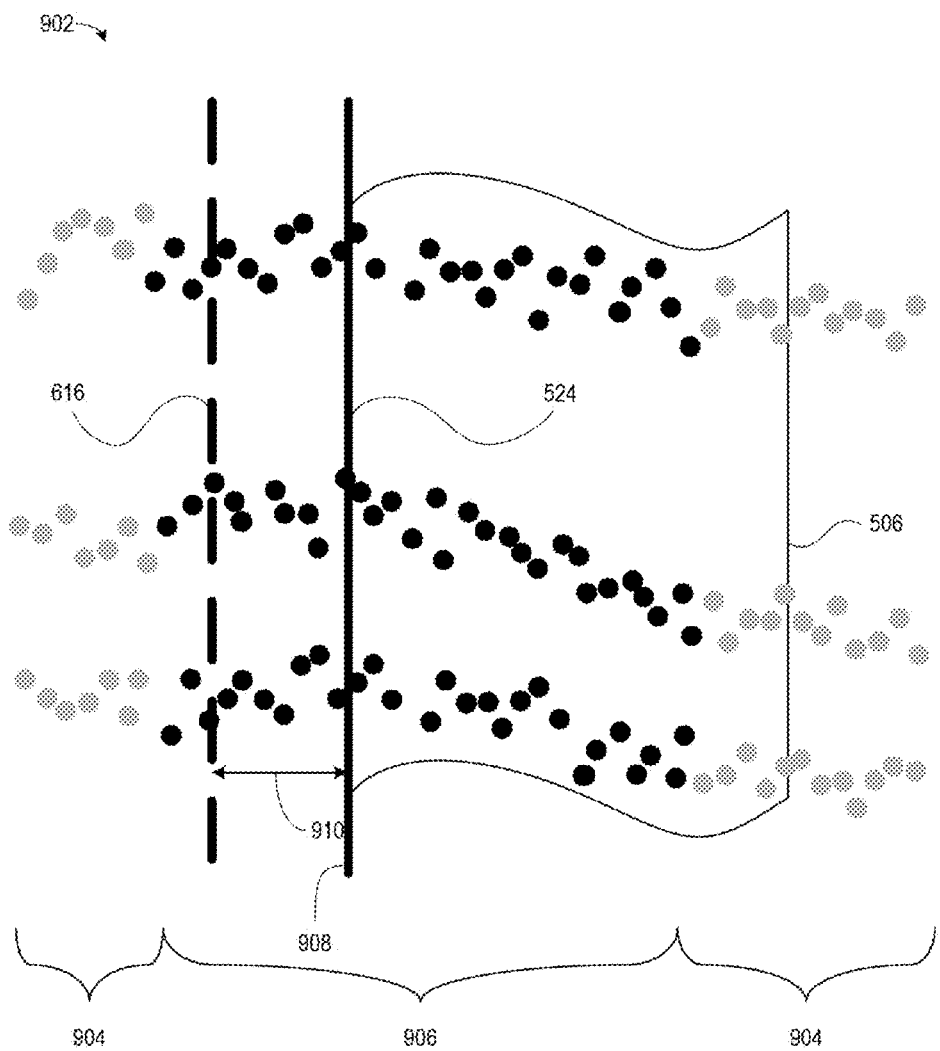
FIG. 9 illustrates an example of the data points collected by the autonomous driving computer system according to aspects of the disclosure.

FIG. 9 illustrates an example of data points collected by the autonomous driving computer system 106 according to aspects of the disclosure. In particular, FIG. 9 illustrates a detailed view of a section of data points 902 that may have been collected by the autonomous driving computer system 106 and their relationship to the lane line 606 of FIG. 6. In this example, a first subset of data points 904 may be associated with a black or darker area of the roadway, while a second subset of data points 906 may be associated with a lane line. As lane lines are generally more reflective than a black roadway, the first subset of data points 904 may have a lower intensity value than the second subset of data points 906 and are thus depicted as grey (rather than black).

Although FIG. 9 illustrates collecting data points from the reflectivity of one or more lane lines, the autonomous driving computer system 106 may collect data points based on the reflectivity of any type of object. As discussed previously, the autonomous driving computer system 106 may be configured to collect and analyze data points from a variety of objects, including lane lines, such as k-rail concrete barriers, traffic safety cones, billboards etc. During the analysis phase of the collected data points, the autonomous driving computer system 106 may then determine the type of objects represented by the collected data points. Although the discussion below refers primarily to the lane lines shown in FIG. 6, similar analysis of the collected data points may be performed for other types of objects as well.

To determine a potential set of data points that may represent the lane line 606, the autonomous driving computer system 106 may use the previously identified location of the lane line 506 from the detailed map information 136. As discussed previously, lane line 506 of the detailed map information 136 may correspond to the physical lane line 606. In particular, the autonomous driving computer system 106 may use the location of the edge 524 of the lane line 506 as an initial estimate 908 of the edge 616 of the lane line 606. As discussed above, the autonomous driving computer system 106 may reference the prior location of an object (e.g., a k-rail concrete barrier, lane line, traffic safety cone, etc.) to determine the type of object represented by the collected data points.

In the analysis of the collected data points, it may be that the current physical location of edge 616 differs from its previously stored location (i.e., the location of edge 524). For example, it may be that construction or a vehicle accident has caused a shift in one or more of the lane lines 604-606. Thus, there may be a distance difference 910 between the detected edge 616 and the prior location of the corresponding lane edge 524. Moreover, the distance difference 910 may correspond to the difference in distance between the detected lane edge 616 and the lane edge estimate 908. As discussed below, the autonomous driving computer system 106 may determine whether the driving environment has changed (e.g., one or more lane lines have shifted) based on the distance difference 910 between a detected object and its previously stored location.

To more accurately determine the location of the lane line 606, the autonomous driving computer system 106 may use an initial estimate 908 of the edge 616 of the lane line 606 to generate additional possible estimates. For example, a set of possible locations for the edge 616 of the lane line 606 may be generated by offsetting the initial estimate 908 to the left and to the right (relative to the lane line). The offset may be a relatively small distance, for example, a centimeter or less, and may be repeated in each direction for a much larger distance, for example, 1 meter. The distance difference 910 may be used in determining the offset for the subsequent estimates.

Figure 10:
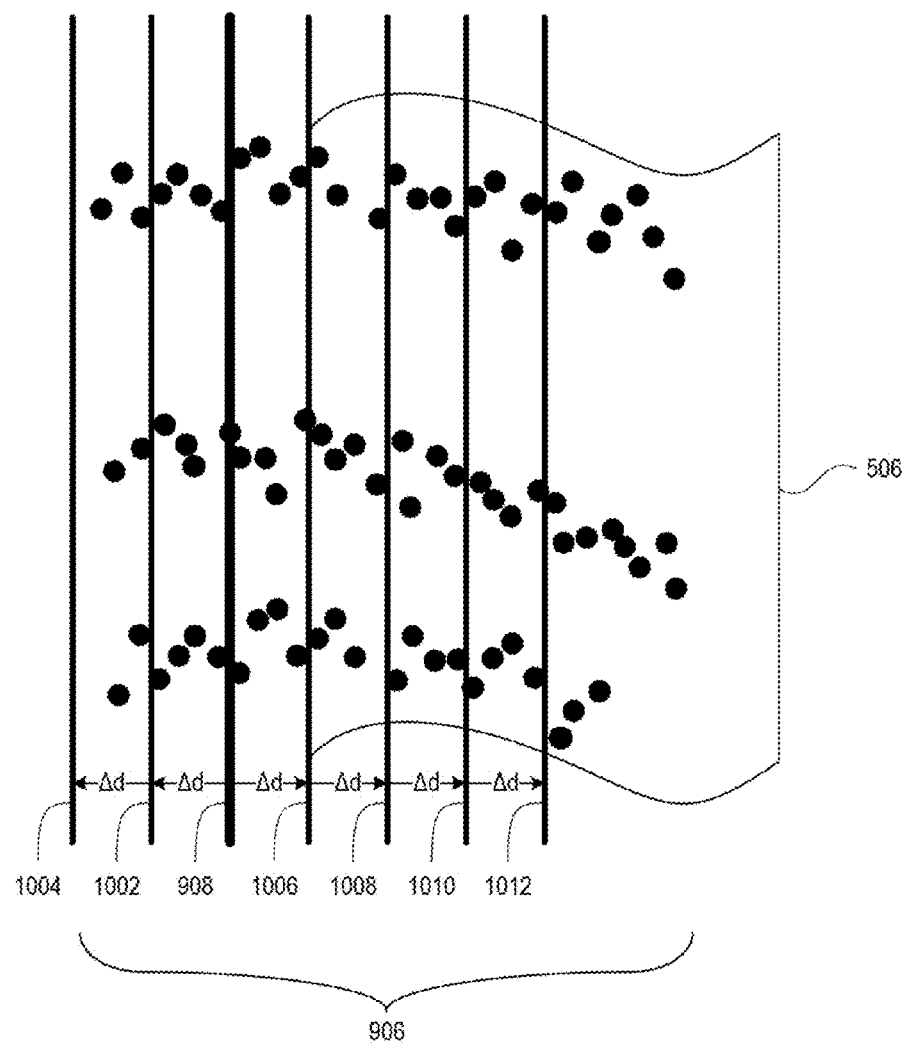
FIG. 10 illustrates an example of offsetting an initial lane estimate to derive further lane estimates according to aspects of the disclosure.

FIG. 10 illustrates one example of offsetting the initial estimate 908 to derive further estimates of the lane 606 according to aspects of the disclosure. The offsets may include six offsets 1002-1012, two to the right and four to the left of the initial estimate 910. Each of these offsets may separated by an offset distance of $\Delta d$. The offset distance $\Delta d$ may be consistent between each of the estimates or it may differ. Moreover, the value of the offset distance $\Delta d$ may correspond to the distance value of the distance difference 910 between the detected lane edge 616 and the lane edge estimate 908 based on the prior location of the lane edge 524.

Each estimate 1002-1012 of the set of estimates may be evaluated to determine how likely a particular estimate is to be the actual lane line edge (i.e., lane line edge 616). Various criteria may be used in this determination. For example, the object detection algorithm 138 may be used to extract lane marker data points or data points that are potentially residing on lane lines. In this example, the criteria may include the total number of lane marker data points within a distance (e.g., on the order of 25 to 40 centimeters), from each estimate of the set and/or the dispersion of the lane marker data points close (e.g., on the order of 25 to 40 centimeters) to the estimate (in particular how well lane marker data points are spread over the entire range of the estimate). The dispersion may be calculated in many ways. For example, the distance between each point in the estimate and some reference point (e.g., the first point in the estimate) could be calculated and the standard deviation of this distance could be used. The higher the standard deviation, the better the spread of the points along the estimate. However, any measure for approximating how well the points are spread out along the estimate would be useful.

The criteria may also include the total number of data points (all data points, and not specifically lane marker data points) within the distance of the estimate, and, if available, the deviation of the estimate from the most recent estimate.

Based on the aforementioned criteria, the autonomous driving computer system 106 may select an estimate 1002-1012 most likely to be the lane line edge 616. For example, all or some of the aforementioned criteria may be used to determine a likelihood value for each estimate 1002-1012 of the set of estimates. The estimate 1002-1012 with the highest likelihood value may be selected as the most likely estimate. The autonomous driving computer system 106 may then identify a set of data points by filtering all of the data points or the lane marker data points which are within a distance of the selected estimate. Again, the filter may be on the order of 25 to 40 centimeters.

The identified set of data points may be fit to a model describing the location and shape of the lane edge 616. For example, the fit may be based on parametric models such linear, cubic, higher-order polynomials, splines, or clothoids, or non-parametric models. The fit may also involve using a least squares method and a quadratic model. In this example, to improve the robustness of the parametric model, an independent variable used for the model may first be aligned with a heading or principle direction for the estimate. For example, for edge 616, the direction of rail 518 (or some small deviation from the direction) for lane 514 may be the direction of the estimate.

In some examples, the model may be post-processed to remove any noisy sections. This may be useful at end points (between broken sections of a lane line or simply the end of a lane line) where there are only few data points have a significant bearing on the solution. The autonomous driving computer system 106 may analyze the number points used to calculate a particular part of the estimate (the support) over various sections of the model. This may include comparing the absolute number of data points of the identified set of data points in a given section to the number of data points of the identified set of data points of other second or over the entire model. The analysis may also include evaluating the curvature or smoothness of sections and filtering or smoothing out those sections that appear spurious. For example, some end sections can be removed or other sections can be smoothed so that the sections deviate less from the adjacent sections. In this regard, if an end section of the estimate does not have enough support, it may be removed from the estimate, so that the estimate does not extend as far as it originally did.

Although the above examples relate to estimating and modeling the location of a single edge of a lane line, the estimate of another edge or other edges may be computed simultaneously or in any other order. In addition, the aspects above may be applied to the edges of other types of lane markers, such as reflectors. The autonomous driving computer system 106 may also calculate all, or less than all, of the edges proximate to the vehicle (for example within the line of sight of laser 302 and/or laser 304). This may be useful where the laser scan data is being used to generate map information.

If the vehicle is driving autonomously, the autonomous driving computer system 106 may estimate locations for all of the edges or only the locations of those edges of the lane in which the vehicle is traveling. For example, referring to FIG. 6, the vehicle 104 is driving in lane 614. Thus, the autonomous driving computer system 106 may estimate a model of the location of edges 616 and/or 618. The autonomous driving computer system 106 may also estimate a model of the locations of other edges such as edges 570 and/or 572.

When the autonomous driving computer system 106 has determined the model to best represent lane line edge 616, the autonomous driving computer system 106 may then determine whether the driving environment of the vehicle 104 has changed relative to the previously stored detailed map information 136.

Although the foregoing discussion focused on performing lane line edge detection and modeling, the autonomous driving computer system 106 may have conducted an analysis of the collected data points for any type of object. For example, the foregoing detection and object modeling may have been conducted for data points collected based on the reflectivity of a k-rail concrete barrier, a traffic safety cone, a billboard, a restaurant, and any other type of object.

Moreover, the foregoing object detection and modeling methodology may be applied to a hierarchical classification of object types. For example, the autonomous driving computer system 106 may determine location estimates for objects classified as primary object types, such as lane edges, reflectors, and other objects that are integral to the road. The autonomous driving computer system 106 may also determine estimates for objects classified as secondary object types, such as traffic safety cones and k-rail concrete barriers. In alternative embodiments, a secondary object type may be assigned as a primary object type.

The hierarchical classification of object types may be leveraged by the autonomous driving computer system 106 to predict, within a degree of accuracy, whether the driving environment has changed. For example, where the estimated locations of the primary object types indicates a significant change in the current detected location from the previously stored location, then the autonomous driving computer system 106 may determine with a high degree of accuracy that the driving environment has changed. A significant change may be based on a difference threshold, such as where the change is greater than a predetermined difference, e.g., one centimeter, ten centimeters, one meter, and so forth.

When a significant change is detected, the autonomous driving computer system 106 may forego an estimate analysis of the secondary object types. The autonomous driving computer system 106 may also use estimates and models of the secondary object types to further increase the accuracy that the driving environment has changed or for any other reason (e.g., to confirm that the estimates of the primary object types are accurate).

However, where the estimated location of the primary object types is inconclusive or within a degree of tolerance (e.g., less than the difference threshold but greater than a minimum difference threshold), the autonomous driving computer system 106 may conduct an estimate analysis based on one or more of the secondary object types. For example, should the estimated location of a primary object be less than ten centimeters, but greater than three centimeters, from its expected location, the autonomous driving computer system 106 may conduct the estimate analysis based on secondary object types.

In addition, depending on the complexity of the hierarchical classification, there may be tertiary object types, quaternary object types, and so forth. Similarly, there may be a secondary difference threshold, a secondary minimum difference threshold, and other similar difference thresholds corresponding to the number of different hierarchy levels. In this manner, the autonomous driving computer system 106 may determine whether a driving environment has changed based on differences between the detected location of various object types and their corresponding previously stored locations.

In one embodiment of determining whether the driving environment of the vehicle 104 has changed, the autonomous driving computer system 106 may determine a model representing a primary object, such as the lane line edge 616, and compare the location of determined model with a model representing the prior stored location of the primary object (i.e., the lane line edge 524). The autonomous driving computer system 106 may use one or more algorithms stored in the memory 110 for comparing the various models. For example, the autonomous driving computer system 106 may use a map discrepancy algorithm 140 stored in the memory 110.

Figure 11A:
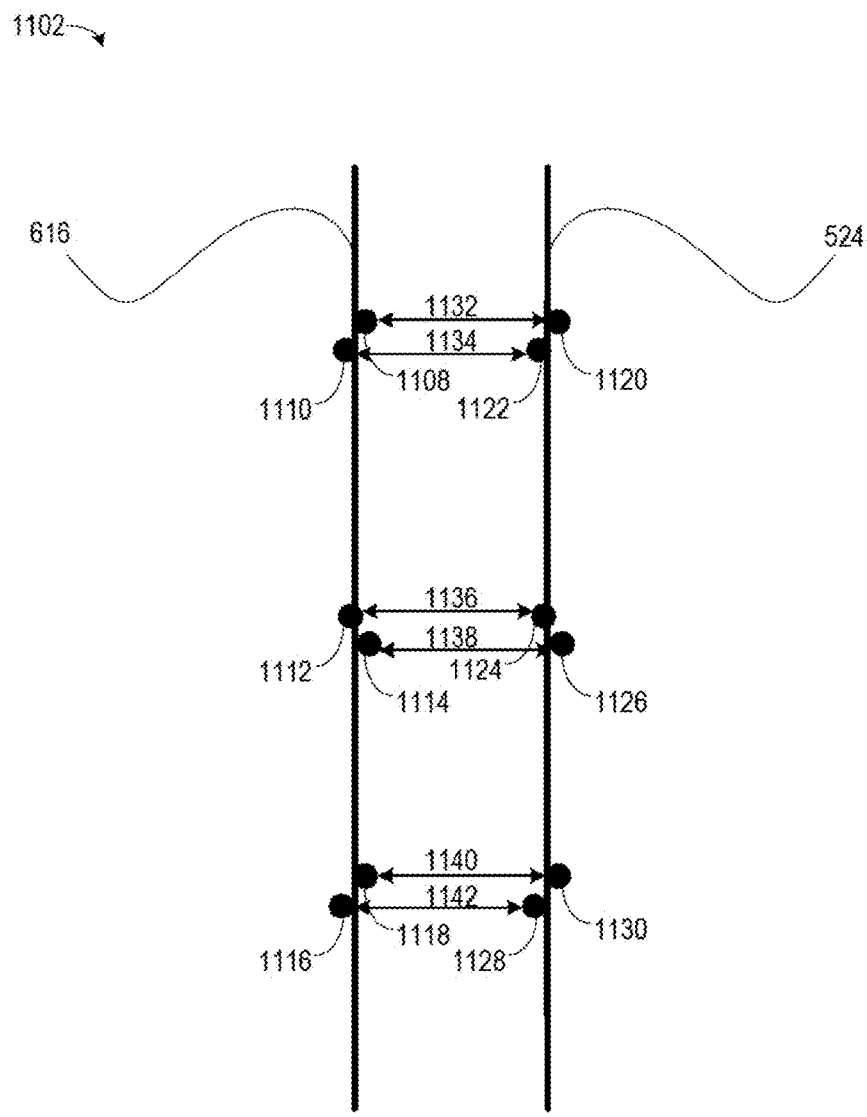
FIGS. 11A-11C illustrate examples of determining various metrics for identifying changes in a driving environment according to aspects of the disclosure.
Figure 11B:
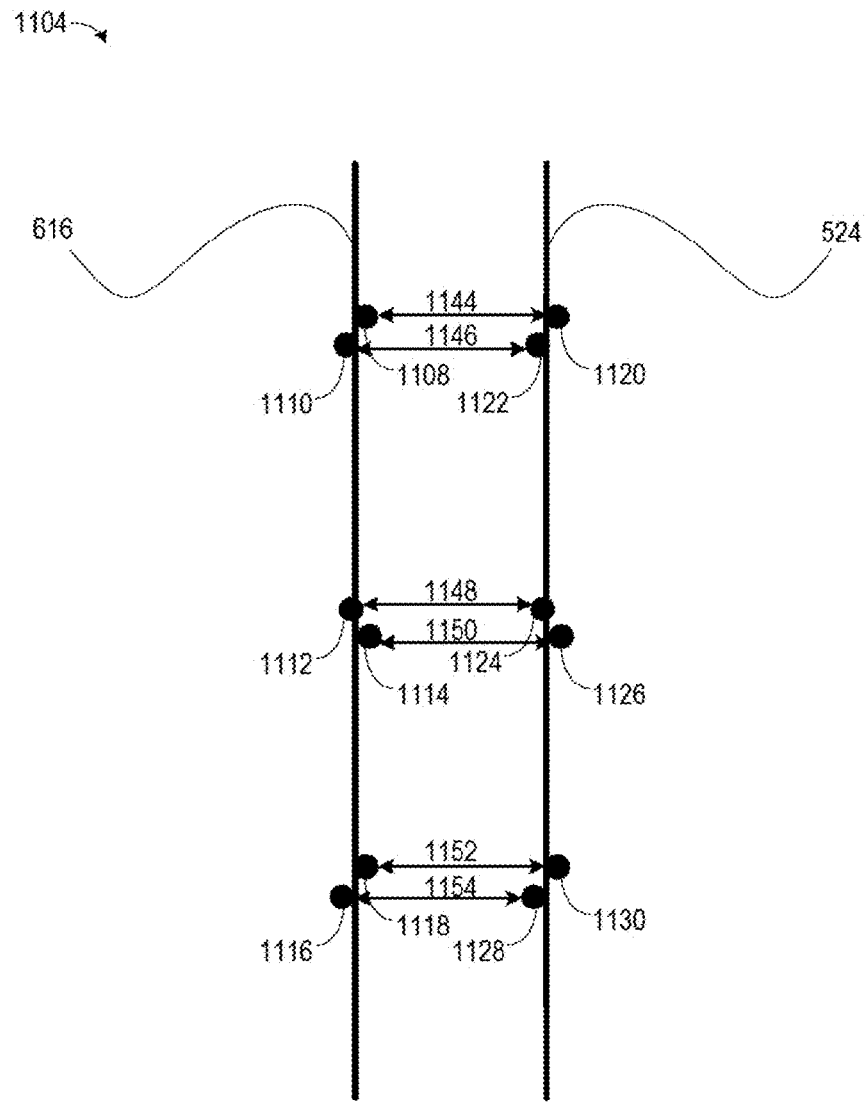
Figure 11C:
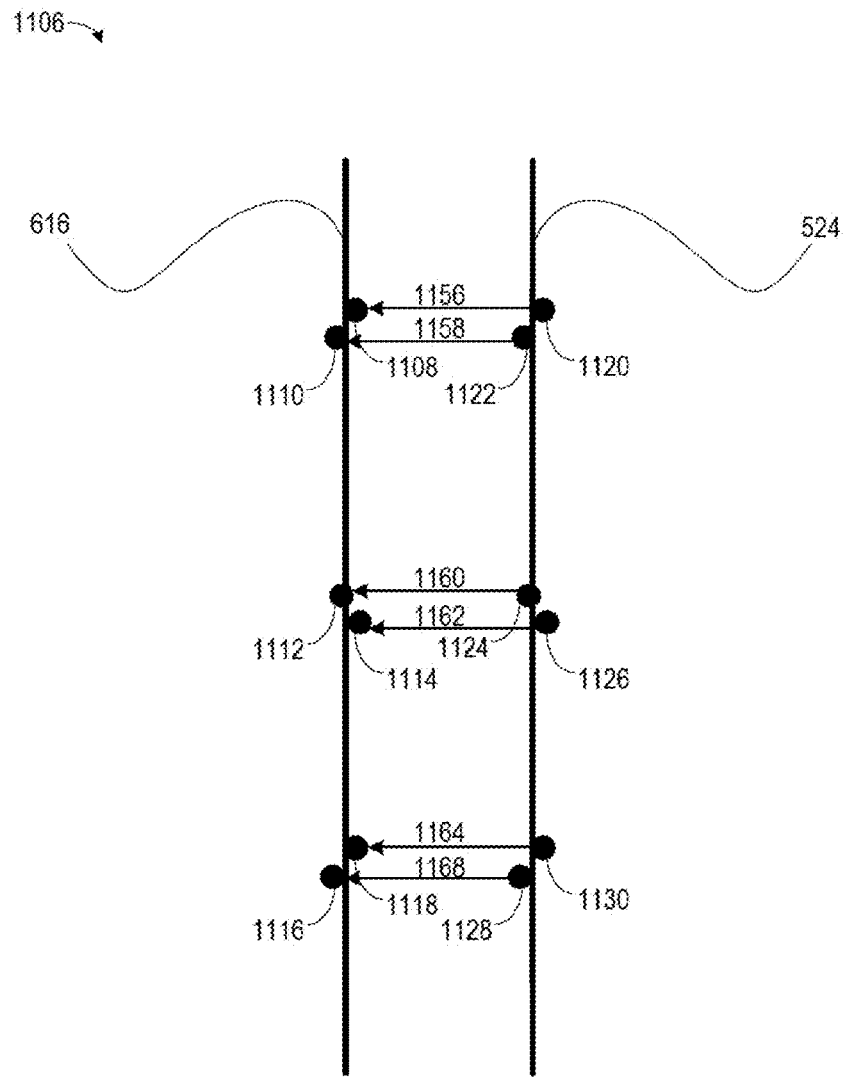

FIGS. 11A-11C illustrate examples 1102-1106 of the autonomous driving computer system 106 comparing the data points 1108-1118 of a model for the detected lane line edge 616 with the data points 1120-1130 of a model for the stored lane line edge 524. Each of the examples 1102-1106 illustrates an exemplary metric (or metrics) that may be determined by the autonomous driving computer system 106. Although examples 1102-1106 refer to comparing the data points of models of the lane line edge 616 and the stored lane line edge 524, the autonomous driving computer system 106 may also compare data points of models of other objects, such as k-rail concrete barriers, rail guards, billboards, and other such objects.

In comparing the data points 1108-1118 with the data points 1120-1130, the autonomous driving computer system 106 may determine a number of metrics. FIG. 11A illustrates an example 1102 of determining a maximum deviation metric based on the determined deviations 1132-1142 of the data points 1108-1118 and the data points 1120-1130. To determine the maximum deviation metric for the data points 1108-1118 and data points 1120-1130, the autonomous driving computer system 106 may determine one or more distance deviations 1132-1142 for corresponding pairs of data points, such as a distance deviation 1132 for data point 1108 and data point 1120. A distance deviation may indicate the amount of separation or distance between one or more data points.

Other distance deviations include a distance deviation 1134 for data point 1110 and data point 1122, a distance deviation 1136 for a data point 1112 and data point 1124, a distance deviation 1138 for a data point 1114 and a data point 1126, a distance deviation 1140 for a data point 1118 and a data point 1130, and a distance deviation 1142 for a data point 1116 and a data point 1128.

The distance deviations 1132-1142 may be measurements of any type such as pixels, feet, inches, millimeters, or any other measurement. A maximum deviation (i.e., a deviation having the greatest value) may then be selected from the determined distance deviations 1132-1142.

FIG. 11B illustrates another example 1104 of a metric that may be determined by the autonomous driving computer system 106 in evaluating whether a change in the driving environment occurred. In particular, FIG. 11B illustrates determining an average deviation (i.e., an average offset) based on corresponding pairs of one or more data points. In the example 1104 of FIG. 11B, the autonomous driving computer system 106 may determine one or more distance deviations 1144-1154 based on data points 1108-1118 and data points 1120-1130. The average deviation determined by the autonomous driving computer system 106 may be an average of the determined distance deviations 1144-1154. The values of the distance deviations 1144-1154 may be similar, or equal to, the values of the distance deviations 1132-1142 shown in FIG. 11A.

FIG. 11C illustrates yet a further example 1106 of a metric that may be determined by the autonomous driving computer system 106. The autonomous driving computer system 106 may be configured to determine an average signed deviation (i.e., offset) based on one or more distance deviations 1156-1168. With the average signed deviation, the autonomous driving computer system 106 may be configured to account, not only the value of the distance between pairs of data points, but also the direction (i.e., "postiveness" or "negativeness") of the deviation. With regard to postiveness or negativeness of the deviation, the autonomous driving computer system 106 may be configured to assume that a data point of a previously identified object starts at a origination point along an imaginary X-axis, and that a detected data point is accordingly assigned a value to the left (negative) or right (positive) of this origination point. Alternatively, the direction of the deviation may be based on whether the change in the direction is to the left or right of the data point of the previously detected object.

As shown in FIG. 11C, the average signed deviation may be a negative value, as many of the detected data points 1108-1118 have been detected to the left of the previously detected data points 1120-1130. However, it is conceivable that the deviations 1156-1168 include a mix of positive deviations (i.e., detected data points to the right of previously detected data points), negative deviations (i.e., detected data points to the left of previously detected data points), and deviations that are neutral (i.e., detected data points being detected in substantially the same location as previously detected data points). The average signed deviation determined by the autonomous driving computer system 106 may be an average (in direction and/or value) of the deviations 1156-1168.

Having determined the three metrics discussed above (maximum deviation, average deviation, and average signed deviation), the autonomous driving computer system 106 may then determine a confidence probability that the driving environment has changed for the vehicle 104. In one example, each of the metrics may be compared to a corresponding threshold that yields a binary value of whether the driving environment has changed. For example, based on a comparison of the maximum deviation metric with a maximum deviation metric threshold, the autonomous driving computer system 106 may determine that the driving environment has changed (yes/no). Similar comparisons may be made for the average deviation with an average deviation threshold, and for the average signed deviation with an average signed deviation threshold. These binary decisions may then each be weighted to yield a confidence probability that the driving environment has changed. One or more of the thresholds may be determined based on prior data (i.e., comparisons of objects in a known, changed environment) or determined by prior experimental testing.

Alternatively, or in addition, the metrics may be used as input for a probability model that also provides a confidence probability that the driving environment has changed. The probability model may be based on experimental or empirical data from driving environments that are known to have changed.

Based on the determined confidence probability, the autonomous driving computer system 106 may determine additional or alternative confidence probabilities to confirm whether the driving environment has changed. For example, where the determined confidence probability of a primary object type (e.g., lane markers) is below a given confidence probability threshold or within a tolerance of error, the autonomous driving computer system 106 may determine yet another confidence probability for another primary object type (e.g., k-rail concrete barriers) to confirm whether the driving environment has changed. Alternatively, or in addition, the autonomous driving computer system 106 may determine confidence probabilities for secondary or tertiary object types to confirm whether there has been a change in the driving environment. As the autonomous driving computer system 106 determines additional or alternative confidence probabilities, the autonomous driving computer system 106 increases the accuracy of determining that the driving environment has changed.

The confidence probabilities and thresholds may vary according to driving environments. For example, a single lane road may experience less construction or lane changes than a highway. Accordingly, the thresholds discussed above may be assigned different values depending on the driving environment of the vehicle. As an example, a driving environment of a single lane road may be given a higher threshold than a driving environment of a highway, which may be given a lower threshold. It is also conceivable that driving environments are assigned the same, or substantially the same, thresholds.

Figure 12A:
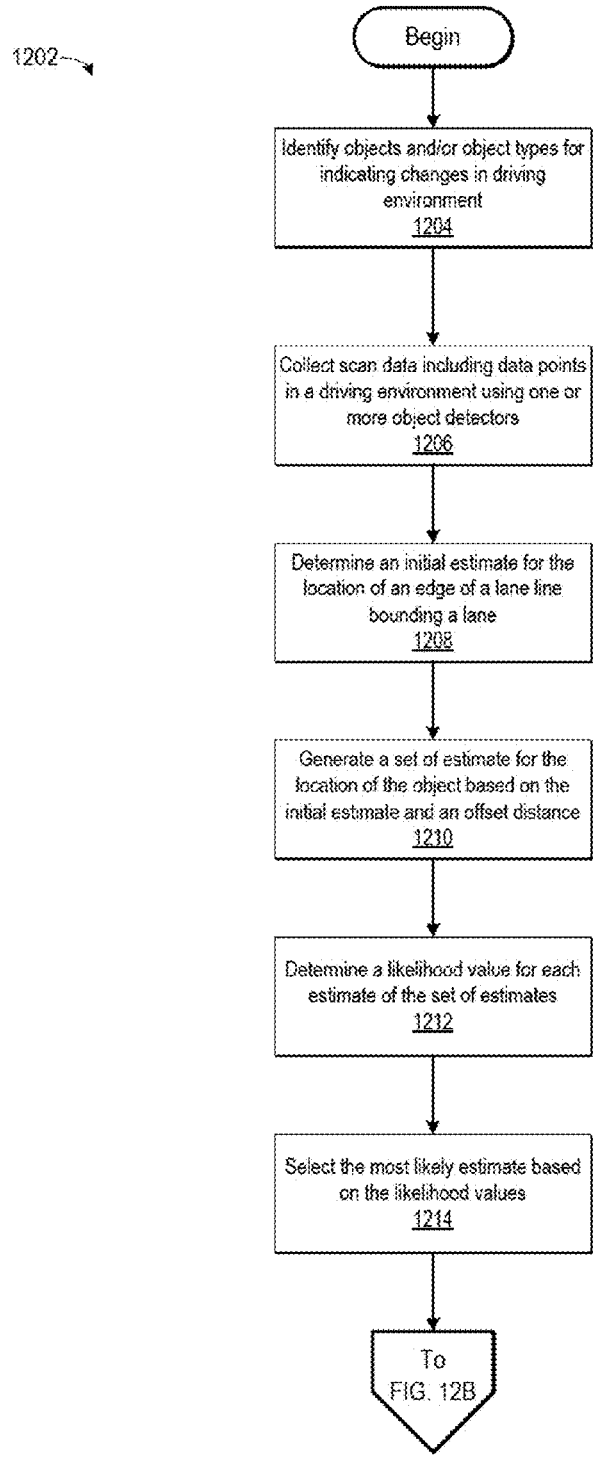
FIGS. 12A-12C illustrate logic flow for identifying changes in a driving environment according to aspects of the disclosure.
Figure 12B:
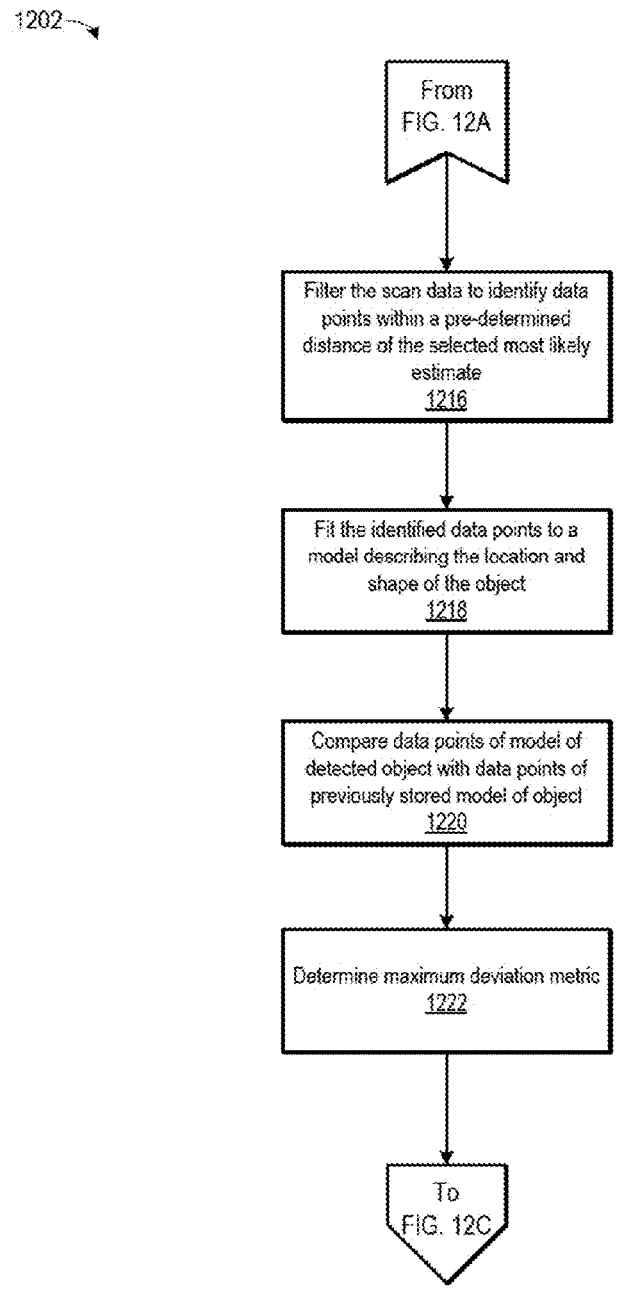

FIGS. 12A-12B illustrates an example of logic flow 1202 for determining whether the driving environment of the vehicle 104 has changed according to aspects of the disclosure. The operations shown in FIGS. 12A-12B may be performed sequentially or at varying times. Moreover, one or more of the operations shown in FIGS. 12A-12B may be performed by one or more of the processors and/or systems previously discussed.

Initially, a set of objects or object types may be identified in the detailed map information of the vehicle 104 that serve as indicators for determining whether a driving environment has changed (Block 1204). As discussed previously, identified objects may include lane markers, lane edges, lane reflectors, billboards, traffic safety cones, restaurants, or other objects. Object types may also be included such that the identification of a given object type may indicate that objects having the given object type are to be used as indicators for determining whether a driving environment has changed. In addition, a hierarchy of objects and/or object types may be established such that the autonomous driving computer system 106 may refer to the hierarchy should there be a need to resolve potential ambiguity as to whether a driving environment has changed based on a given object or object type.

While in a driving environment, scan data, such as laser scan data, may then be collected using one or more object detectors, such as laser 302 and/or laser 304 (Block 1206). The scan data may include one or more data points for a detected object. As discussed previously, the data points may describe intensity and location information for objects from which laser light was reflected.

Using the scan data, an initial estimate for the location of an object, such as the edge of a lane line bounding a lane, may then be determined (Block 1208). Estimates may also be determined for other types of detected objects (e.g., k-rail concrete barriers, traffic safety cones, etc.) The initial estimate may be determined based on detailed map information, previous estimates, and/or any of the examples described above. Moreover, it is possible that the location of the detected object has since shifted or moved from its previously detected location.

The initial estimate may then be used to generate a set of possible estimates for the location of the object based on an offset distance (Block 1210). The offset distance may be predetermined and stored in the autonomous driving computer system 106. Moreover, the offset distance may be determined based on a difference distance between the detected object and its prior location identified in the detailed map information 136. For each estimate of the set of estimates, a likelihood value is determined. The likelihood value may indicate how likely the estimate is to be the actual location of the detected object (Block 1212). The most likely estimate may then be selected based on the likelihood values (Block 1214).

The scan data may then be filtered to identify data points within a pre-determined distance of the selected most likely estimate (Block 1216). The filtering may also include using an object detection algorithm. The identified data points may then be fit to a model describing the location and shape of the detected object (Block 1218). As described above, these steps may be repeated or performed simultaneously to in order to determine models of other detected objects (e.g., lane line edges, traffic safety cones, lane reflectors, etc.).

The resulting models may then be used by the autonomous driving computer system 106 to determine whether the driving environment has changed based on previously stored models of those objects in the detailed map information 136. Initially, the data points from the model of the detected object may be compared with the data points of the previously stored model of the object (Block 1220).

Figure 12C:
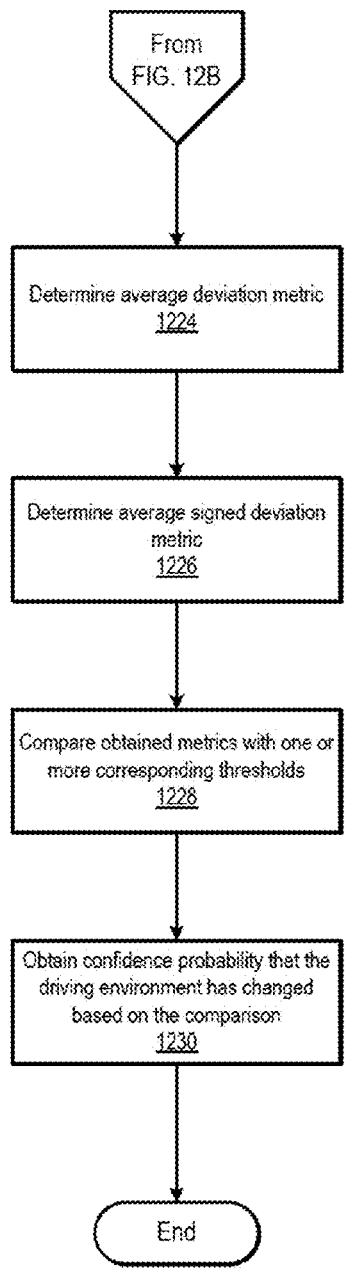

In performing the comparison, the autonomous driving computer system 106 may obtain various metrics. For example, the autonomous driving computer system 106 may determine a maximum deviation metric (Block 1222). Referring to FIG. 12C, the autonomous driving computer system 106 may also obtain an average deviation metric (Block 1224), and an average signed deviation metric (Block 1226).

One or more of these metrics may then be compared to corresponding thresholds (e.g., a maximum deviation threshold, an average deviation threshold, etc.) to determine whether a change in the driving environment has occurred (Block 1228). The comparison may yield a confidence probability indicating the degree of confidence that the autonomous driving computer system 106 has in that the driving environment has changed (Block 1230). Moreover, one or more of the obtained metrics may be weighted to further increase the accuracy of the obtained confidence probability. The metrics may be further used as inputs to a probability model to also obtain a confidence probability.

Furthermore, the autonomous driving computer system 106 may perform the foregoing analysis for other objects and/or object types based on a comparison of the obtained confidence probability with a confidence probability threshold. The resulting obtained confidence probabilities may be leveraged by the autonomous driving computer system 106 to determine whether the driving environment has changed, such as by comparing one or more of the obtained confidence probabilities with one or more of the confidence probability thresholds.

In this manner, the autonomous driving computer system 106 may be configured to determine whether there is a discrepancy in the previously stored detailed map information 136 and the objects currently detected in the vehicle's driving environment. By leveraging a hierarchical classification of object types, the autonomous driving computer system 106 is able to readily discern whether there has been a change in a driving environment when there is some ambiguity in the detected location of various objects or object types. Moreover, because the autonomous driving computer system 106 leverages multiple metrics, the autonomous driving computer system 106 further increases the probability that a detected change in the location of an object (or object types) is the result of an actual change in the driving environment (and not due to a sensor error, e.g., a faulty sensor). Thus, the disclosed autonomous driving computer system 106 represents an advancement in object detection and maneuvering within a driving environment.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:
1. An apparatus:
   memory configured to store map information including first location information including an expected location of a first object corresponding to a prior observation of the first object in a driving environment of a vehicle, the first object having been identified as a primary object for use in determining whether the driving environment has changed; and
   a processor in communication with the computer-readable memory, the processor being configured to:
      receive sensor information for a second object having been detected in the driving environment corresponding to the first object;
      determine second location information for the second object based on the received sensor information;
      determine a first discrepancy metric by comparing the first location information with the second location information;
      determine a confidence probability that the driving environment has changed based on the first discrepancy metric; and,
      determine that the driving environment has changed when the confidence probability exceeds a confidence probability threshold.

2. The apparatus of claim 1, wherein the first discrepancy metric comprises a maximum deviation metric that indicates a maximum deviation value between the first location information and the second location information.

3. The apparatus of claim 1, wherein the first discrepancy metric comprises an average deviation metric that indicates an average deviation value between the first location information and the second location information.

4. The apparatus of claim 1, wherein the first discrepancy metric comprises an average signed deviation metric that indicates a signed deviation value between the first location information and the second location information.

5. The apparatus of claim 1, wherein:
   the map information further includes third location including an expected location of a third object corresponding to a prior observation of a location of a third object in the driving environment of the vehicle, wherein:
      the third object has been identified as another primary object for use in determining whether the driving environment has changed; and
      the third object is of a different object type than an object type of the first object; and
   the processor is further configured to:
      obtain fourth location information for a fourth object detected in the driving environment, wherein the fourth object corresponds to the third object;
      determine a second discrepancy metric by comparing the third location information with the fourth location information; and
      re-determine the confidence probability based on the second discrepancy metric and the comparison of the confidence probability with the confidence probability threshold.

6. The apparatus of claim 1, wherein:
   the computer-readable memory is further configured to store a hierarchy of object types, the hierarchy of object types indicating which of the object types are to be used first in determining whether the driving environment has changed; and
   the processor is further configured to determine the confidence probability based on the hierarchy of object types.

7. The apparatus of claim 1, wherein the first location information indicates that the first object is in a first location and the second location information indicates that the second object is in a second location, the second location being a different location than the first location.

8. The apparatus of claim 1, wherein the processor determines the confidence probability based on the first discrepancy metric when the first discrepancy metric exceeds a first discrepancy threshold and a second discrepancy threshold.

9. The apparatus of claim 1, wherein:
   the first location information comprises a first plurality of laser data points obtained from a prior detection of the first object;
   the second location information comprises a second plurality of laser data points obtained from the detection of the first object; and
   the processor determines the first discrepancy metric by comparing the first plurality of laser data points with the second plurality of laser data points.

10. A method comprising:
    receiving, by a processor, sensor information from a sensor identifying a first object having been detected in the driving environment;
    determining, by the processor, first location information for the first object based on the received sensor information;
    retrieving, by the processor, map information corresponding to the first object including second location information including an expected location of a second object based on a prior observed location of the first object in the driving environment of the vehicle, the second object having been identified as a primary object for use in determining whether a driving environment has changed;
    determining, by the processor, a first discrepancy metric by comparing the first location information with the second location information;
    determining, by the processor, a confidence probability that the driving environment has changed from the prior observation based on the first discrepancy metric; and,
    determining, by the processor, that the driving environment has changed from the prior observation by comparing the confidence probability with a confidence probability threshold.

11. The method of claim 10, wherein the first discrepancy metric comprises a maximum deviation metric that indicates a maximum deviation value between the first location information and the second location information.

12. The method of claim 10, wherein the first discrepancy metric comprises an average deviation metric that indicates an average deviation value between the first location information and the second location information.

13. The method of claim 10, wherein the first discrepancy metric comprises an average signed deviation metric that indicates a signed deviation value between the first location information and the second location information.

14. The method of claim 10, further comprising:
    determining, by the processor, third location information for a third object detected in the driving environment;
    retrieving fourth location information from the map information, wherein the fourth location information includes an expected location of a fourth object corresponding to a prior observed location of the fourth object in the driving environment, the fourth object corresponding to the third object;
    determining, with the processor, a second discrepancy metric by comparing the third location information with fourth location information; and
    re-determining the confidence probability based on the second discrepancy metric and the comparison of the confidence probability with the confidence probability threshold.

15. The method of claim 10, further comprising:
    determining, by the processor, the confidence probability based on a hierarchy of object types, the hierarchy of object types being stored in the computer-readable memory and indicating which of the object types are to be used first in determining whether the driving environment has changed.

16. The method of claim 10, wherein the first location information indicates that the first object is in a first location and the second location information indicates that the second object is in a second location, the second location being a different location than the first location.

17. The method of claim 10, further comprising:
    determining, by the processor, the confidence probability based on the first discrepancy metric when the first discrepancy metric exceeds a first discrepancy threshold and a second discrepancy threshold.

18. The method of claim 10, wherein:
    the first location information comprises a first plurality of laser data points obtained from a prior detection of the first object; and
    the second location information comprises a second plurality of laser data points obtained from the detection of the first object; and
    the method further comprises:
        determining, by the processor, the first discrepancy metric by comparing the first plurality of laser data points with the second plurality of laser data points.

19. A non-transitory, tangible computer-readable medium on which instructions are stored, the instructions, when executed by one or more processors, cause the one or more processors to perform a method, the method comprising:
    receiving sensor information from a sensor identifying a first object having been detected in the driving environment;
    determining first location information for the first object based on the received sensor information;
    retrieving map information corresponding to the first object including second location information including an expected location of a second object based on a prior observed location of the first object in the driving environment of the vehicle, the second object having been identified as a primary object for use in determining whether a driving environment has changed;
    determining a first discrepancy metric by comparing the first location information with the second location information;
    determining a confidence probability that the driving environment has changed from the prior observation based on the first discrepancy metric; and,
    determining that the driving environment has changed from the prior observation by comparing the confidence probability with a confidence probability threshold.

20. The method of claim 10, further comprising controlling the vehicle, by the processor, based on the determination that the driving environment has changed.

* * * * *